(12) United States Patent  
Mills

(10) Patent No.: US 6,594,532 B2  
(45) Date of Patent: Jul. 15, 2003

(54) MOVEMENT CONTROL BY A METROLOGICAL INSTRUMENT

(75) Inventor: Michael Mills, Leicester (GB)

(73) Assignee: Taylor Hobson Limited, Leicester (GB)

( * ) Notice: Subject to any disclaimer, the term of this patent is extended or adjusted under 35 U.S.C. 154(b) by 0 days.

(21) Appl. No.: 09/991,919

(22) Filed: Nov. 26, 2001

(65) Prior Publication Data

US 2002/0059041 A1 May 16, 2002

Related U.S. Application Data

(63) Continuation of application No. PCT/GB00/02022, filed on May 26, 2000.

(30) Foreign Application Priority Data

May 28, 1999 (GB) .............................................. 9912601

(51) Int. Cl.$^7$ ............................................. G05B 19/18
(52) U.S. Cl. ..................... 700/56; 700/195; 702/168; 33/549; 33/555; 33/556; 33/559; 33/572; 73/866.5
(58) Field of Search .................. 700/56, 195; 702/127, 702/95, 167, 168; 73/865.8, 866.5; 33/549, 572, 559, 555, 556

(56) References Cited

U.S. PATENT DOCUMENTS

| | | | |
|---|---|---|---|
| 4,666,352 A | 5/1987 | Nagao et al. | 409/153 |
| 4,819,339 A | 4/1989 | Kunzmann et al. | 33/503 |
| 5,097,602 A * | 3/1992 | Cross et al. | 33/551 |
| 5,150,314 A | 9/1992 | Garratt et al. | 702/94 |
| 5,152,072 A * | 10/1992 | McMurtry et al. | 33/558 |
| 5,154,002 A * | 10/1992 | Ulbrich | 33/558 |
| 5,189,806 A | 3/1993 | McMurtry et al. | 33/503 |
| 5,209,131 A * | 5/1993 | Baxter | 73/865.8 |
| 5,297,055 A | 3/1994 | Johnstone | 700/195 |
| 5,419,222 A * | 5/1995 | Bieg | 82/1.11 |
| 5,461,797 A * | 10/1995 | Royer et al. | 33/501.7 |

(List continued on next page.)

FOREIGN PATENT DOCUMENTS

| | | | |
|---|---|---|---|
| EP | 0150947 A2 * | 8/1985 | G06K/11/00 |
| EP | 0 275 428 | 7/1988 | G01B/21/04 |
| EP | 0 279 926 | 8/1988 | G01B/21/04 |
| EP | 0 335 474 | 10/1989 | G01B/7/28 |
| EP | 0 647 826 A2 | 4/1995 | G01B/5/20 |
| WO | WO95/08096 | 3/1995 | G01D/3/02 |
| WO | WO97/18533 | 5/1997 | G06T/17/40 |
| WO | WO99/06179 | 2/1999 | B23Q/35/128 |

Primary Examiner—John Follansbee  
Assistant Examiner—Crystal J. Barnes  
(74) Attorney, Agent, or Firm—Finnegan Henderson Farabow Garrett & Dunner, L.L.P.

(57) ABSTRACT

A measurement probe is carried by a carriage movable in a first direction to cause the measurement probe to traverse a measurement path across a surface of an object received by a support surface to provide measurement data representing variations in a second direction different from the first direction of surface features along the measurement path. The support surface is movable in a third direction different from the first and second directions. Measurement of a surface area is effected by controlling the carriage to cause the measurement probe to traverse a plurality of measurement paths across an area of the surface of an object mounted on the support surface and by controlling the support surface to move in the third direction after each measurement path traverse. Measurement data thus obtained for a reference sphere of previously known radius is used to determine the relative orientation of the first and third directions. Measurement data provided by the measurement probe may then be corrected in accordance with any error in the determined relative orientations of the first and third directions.

72 Claims, 20 Drawing Sheets

U.S. PATENT DOCUMENTS

| | | | |
|---|---|---|---|
| 5,517,307 A | | 5/1996 | Buehring et al. ............ 356/494 |
| 5,671,541 A | * | 9/1997 | Dai et al. ..................... 33/502 |
| 5,724,264 A | | 3/1998 | Rosenberg et al. ......... 702/152 |
| 5,743,020 A | * | 4/1998 | Sheldon ........................ 33/559 |
| 5,801,381 A | * | 9/1998 | Flecha et al. ............... 250/306 |
| 5,887,356 A | * | 3/1999 | Sheldon ........................ 33/556 |
| 6,044,170 A | | 3/2000 | Migdal et al. .............. 382/154 |
| 6,076,953 A | * | 6/2000 | Oakley ........................ 700/195 |
| 6,134,506 A | * | 10/2000 | Rosenberg et al. ........... 702/95 |
| 6,161,050 A | * | 12/2000 | Jessee et al. .................. 700/83 |
| 6,327,788 B1 | * | 12/2001 | Seddon et al. ................ 33/551 |

\* cited by examiner

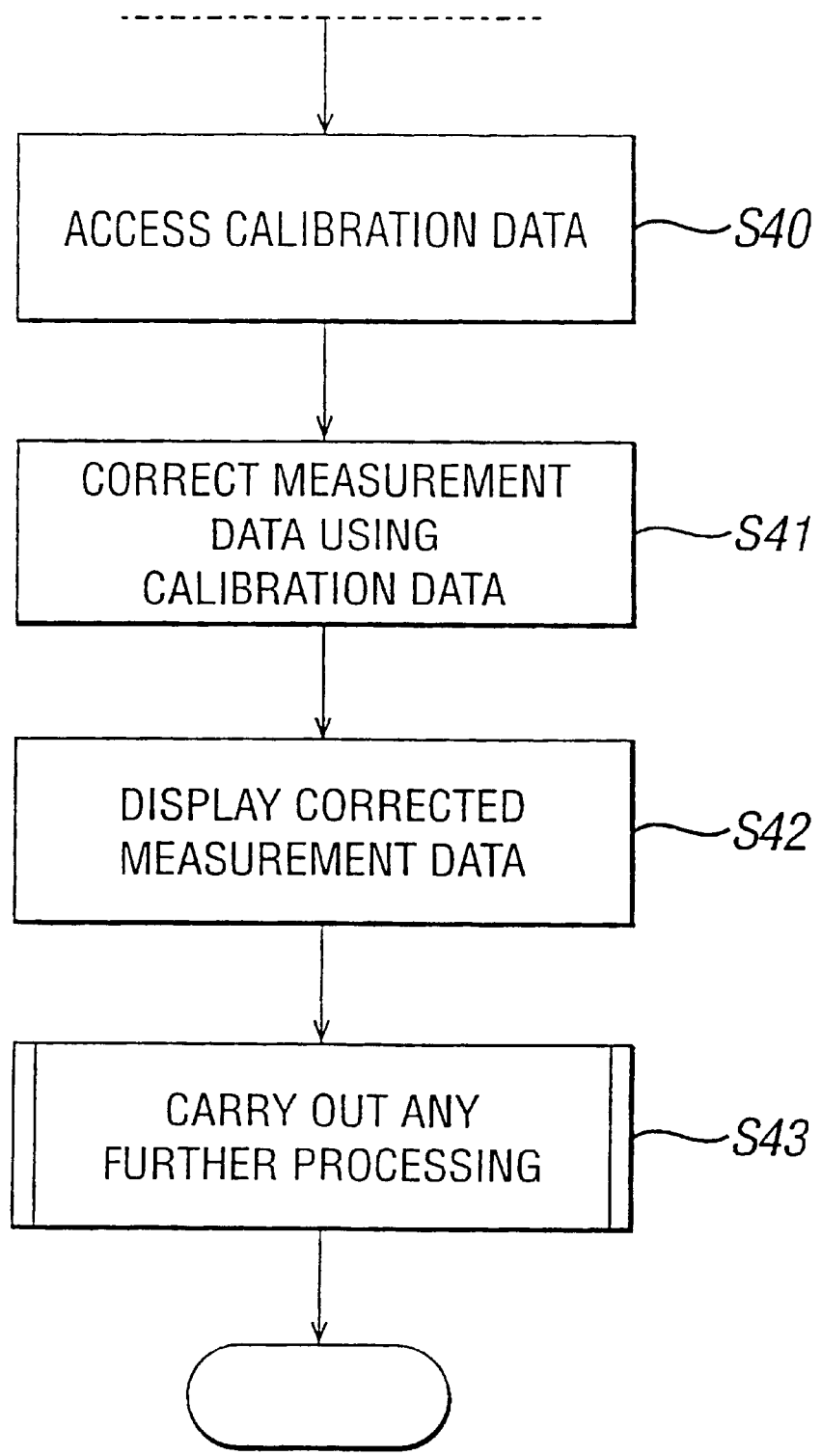
FIG. 16(contd.)

MOVEMENT CONTROL BY A METROLOGICAL INSTRUMENT

CROSS REFERENCE TO RELATED APPLICATIONS

This application is a Continuation of international application number PCT/GB00/02022, filed May 26, 2000, and claims priority of Great Britain Patent Application No. 9912601.3, filed May 28, 1999, the content of which is incorporated herein by reference.

BACKGROUND OF THE INVENTION

This invention relates to a metrological instrument, in particular a metrological instrument capable of measuring both surface form, that is the overall shape of a surface, and the texture or roughness of the surface.

The Form Talysurf Series series of metrological instruments produced by Taylor Hobson Limited of Leicester, England enable a three-dimensional surface area to be mapped and data to be displayed to the user showing the form and texture of that surface area.

In the Form Talysurf (Registered Trademark) Series of instruments this is achieved by causing a measurement probe to traverse the surface area to be measured along a measurement path in a first direction (generally the X direction), then moving a stage carrying the object whose surface is being mapped in a second orthogonal direction (generally the Y direction) and repeating these two steps until the entire area to be mapped has been covered and measurement data consisting of the data collected on a number of parallel measurement paths is obtained.

A graphical representation of the mapped surface area can then be displayed or printed out for a user. Generally, this display will include a perspective view of the three-dimensional surface. This graphical representation then enables the user to determine surface characteristics of the mapped area. For example, the graphical representation may enable a user to determine whether there are cracks or fissures in a sheet surface such as a sheet of steel.

Although such graphical representations enable a user easily to study and interpret surface features of nominally flat surfaces, interpretation of such graphical representations can prove more difficult where the surface being mapped has significant form, for example where the surface consists of or includes curved surfaces. To enable better visual interpretation of the graphical representation when the surface being measured has significant form, form fitting software has been developed and is supplied by Taylor Hobson Limited which uses a polynomial form fitting procedure to enable removal of the form of the surface from the measurement data so that the user can be provided with, for example, independent graphical representations of the overall form of the surface and of the surface texture of the surface.

Although this enables a user to be provided with a good visual indication of the overall surface form and/or surface texture of a desired surface, there is also a desire to be able to measure rather than visualise the three-dimensional form of the surface being measured.

BRIEF SUMMARY OF THE INVENTION

It is an aim of the present invention to provide a metrological instrument that provides an improvement in the accuracy and repeatability of 3-D form measurements.

According to one aspect of the present invention, there is provided a metrological instrument having means for effecting relative movement between a measurement probe and a support surface in a first direction so as to cause the measurement probe to traverse and follow changes in a surface of an object mounted to the support surface, means for effecting relative movement between the support surface and the measurement probe in a second direction orthogonal to the first direction, control means for causing the measurement probe to be moved relative to the surface to be measured in the second direction after the measurement probe completes a measurement path in the first direction so that the measurement probe traverses a plurality of parallel measurement paths, and processing means operable to process measurement data received from the measurement probe as a result of the traversal of the plurality of parallel measurement paths, the processing means being operable to process measurement data received as a result of the measurement probe traversing a surface area of known three-dimensional form to determine the orientation of the second direction relative to the first direction and to provide data representing that relative orientation.

In another aspect, the present invention provides a metrology instrument having means for effecting relative movement between a measurement probe and a surface to be measured in two nominally orthogonal directions and means for calibrating one of the two nominally orthogonal directions relative to the other by using measurement data obtained by measurement of a reference surface of known three-dimensional form.

BRIEF DESCRIPTION OF THE SEVERAL VIEWS OF THE DRAWINGS

Embodiments of the present invention will now be described, by way of example, with reference to the accompanying drawings, in which.

DETAILED DESCRIPTION OF EMBODIMENTS OF THE INVENTION

Figure 1:
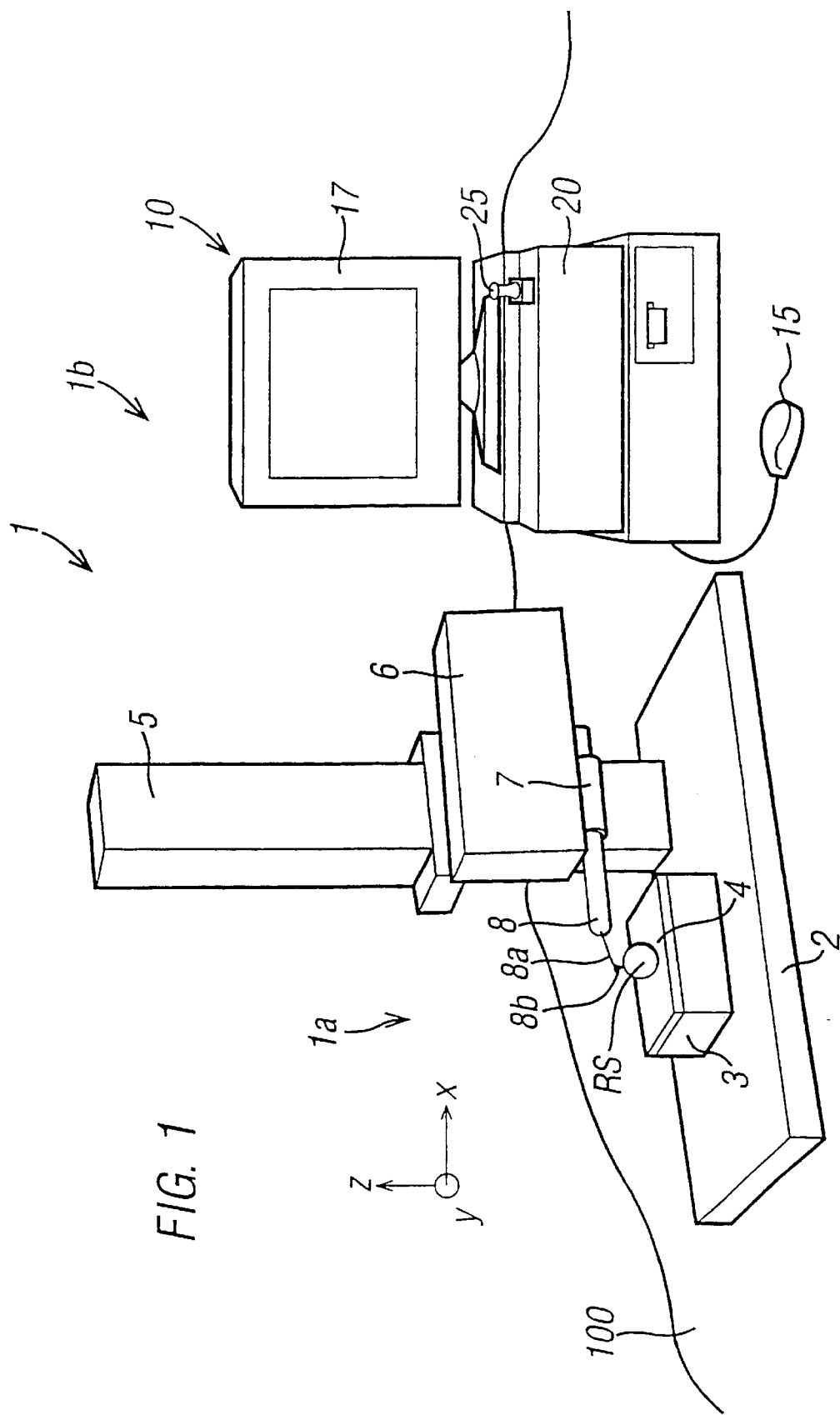
FIG. 1 shows a schematic perspective view of a metrological instrument embodying the present invention.

FIG. 1 shows a schematic perspective view of an instrument based on a Form Talysurf Series metrological instrument 1. In this embodiment, the instrument is intended to be supported on a work surface or desk 100. The instrument 1 has a base 2 designed to be placed on the workbench or desk 100. A workpiece support 3 is mounted to the base 2 and carries a workpiece support platform 4 which is movable relative to the support 3 in the Y direction (that is into the plane of the paper in FIG. 1) by means of a motorised ballscrew arrangement (not shown in FIG. 1).

The base 2 also carries a column 5 which defines a vertical or Z axis reference datum. A column carriage 6 is mounted to the column 5 so as to be movable in the Z direction (that is up and down the column). In this embodiment, movement of the column carriage 6 in the Z direction is effected by a motorised leadscrew drive arrangement (not shown in FIG. 1).

The column carriage 6 carries a measurement probe carriage 7 which is movable relative to the column carriage 6 in the X direction in FIG. 1. In this embodiment, the probe carriage 7 is mounted so as to be slidable along an X axis datum bar mounted within the column carriage 6 and is pushed or pulled along the X axis datum bar by means of a motorised pulley drive arrangement.

The measurement probe carriage 7 carries a measurement probe 8 which, in this embodiment, consists of a pivotally mounted stylus arm 8a carrying at its free end a stylus tip 8b which is arranged to come into contact with the surface to be measured so that, as the measurement probe 8 is traversed across the surface to be measured, the stylus arm 8a pivots to enable the stylus tip 8b to follow variations in the Z direction in the surface. As will be explained in greater detail below with reference to FIG. 2, the measurement probe 8 also has a position transducer which provides electrical signals representing the pivotal movement of the stylus arm.

The components of the instrument mounted on the base 2 form the measurement system 1a of the instrument. The instrument also has a data acquisition, processing and control system (DAPCS) 1b which controls a measurement operation by the measurement system 1a and also processes data received from the measurement system 1a, The DAPCS 1b consists of a personal computer, workstation or the like 10 which interfaces with the measurement system 1a via a master control system 20 as will be explained in greater detail below with reference to FIG. 2.

Figure 2:
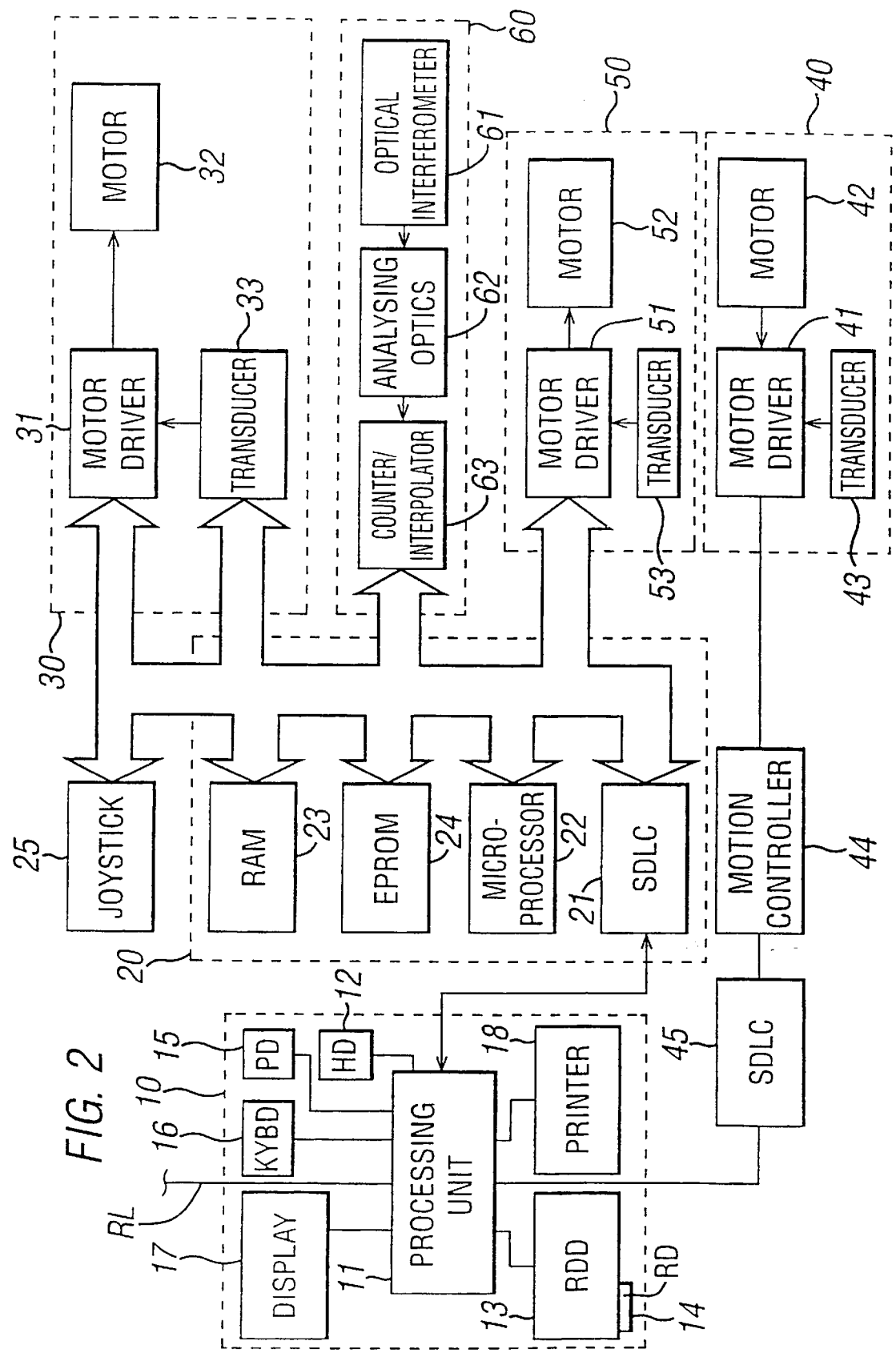
FIG. 2 shows a schematic block diagram for illustrating the functionality of the instrument shown in FIG. 1.

As shown in FIG. 2 and as is known in the art, the personal computer or workstation 10 comprises a processing unit 11 which consists essentially of a processor and associated memory such as ROM and RAM, a hard disk drive (HD) 12, a removable disk drive (RDD) 13 for receiving a removable disk (RD) 14 such as a floppy disk or CD-ROM or the like, a user input device (PD) such as a mouse (as shown in FIG. 1) 15 and a display 17 for displaying information to the user. The personal computer 10 may also have a keyboard (KYBD) 16 for enabling keyed entry of control instructions and the like and a printer 18 for enabling printout of information displayed to the user on the display 17. The processing unit 11 may also have a remote link (RL) to other computing devices. This remote link may be, for example, a connection to a network such as the Internet, an intranet, WAN or LAN connection, or an infrared link.

The computer 10 is used for user input and to process and display measurement results. The computer 10 is coupled via an appropriate interface 21, generally an SDLC serial interface, to the master control system 20 which controls the carrying out of a measurement operation by the measurement system 1a. In this embodiment, the master control system 20 comprises a microprocessor 22, RAM 23, ROM 24 (in the example shown EPROM) and is coupled to a user-operable joystick 25 that may be used, for example, for initial user positioning of the measurement probe and/or for positioning of the column carriage 6 in the Z direction.

The master control system 20 is coupled to X axis drive circuitry 30, Y axis drive circuitry 40, Z axis drive circuitry 50 and measurement transducer circuitry 60.

The X axis drive circuitry 30 comprises a motor driver 31 that receives control instructions from the microprocessor 22 for driving a motor 32 to, as discussed above, move the probe carriage 7 along the X axis datum bar (not shown in FIG. 1 or 2). The X axis drive circuitry also includes an X position transducer 33 that may provide both local feedback control to the motor driver 31 and also X position information to the microprocessor 22 to determine the X positions at which data logging occurs. The X position transducer may be provided as a diffraction grating optical interferometer, for example.

The Y axis drive circuitry in this embodiment is controlled by the computer 10 via a serial link 45 (SDLC) and a motion controller 44. The Y axis drive circuitry in this example comprises a motor driver 41 for receiving drive instructions from the computer 10 (via the motion controller 44) for driving a motor 42 to drive the screw of the ballscrew arrangement so as to drive the ball and therefore the platform 4 coupled to the ballscrew in the Y direction in accordance with the control signals from the computer 10. The Y axis drive circuitry may also include a Y position transducer 43 for providing local feedback control to the motor driver 41. In this embodiment, the Y axis position transducer does not provide information back to the computer 10. Rather, the computer 10 simply provides control signals to the motor driver 41 to cause the motor 40 to move the required distance.

The Z axis drive circuitry 50 comprises a motor driver 51 for receiving control instructions from the microprocessor 22 to drive the motor 52 and a Z axis position transducer 53 for providing local feedback information to the motor driver 51.

The motors 32, 42 and 52 may be, for example, linear stepper motors.

In this embodiment, the measurement transducer circuitry 60 comprises an optical interferometer 61, analysing optics 62 and a counter/interpolator 63. In this embodiment, the measurement transducer circuitry used is that shown and described in the applicant's U.S. Pat. No. 5,517,307 which uses a grating interferometer having a diffraction grating disposed on a curved surface coupled to the probe arm 8a so as to have its center of curvature located at the pivot axis of the probe arm 8a. Other forms of measurement transducer circuitry may be used. Thus, for example, different forms of optical interferometers may be used such as described in, for example, the applicant's PCT Application Publication No. WO97/16701. Measurement transducers other than optical interferometers may be used. Thus, for example, the measurement transducer may comprise an LVDT (linear variable differential transducer) in which one of a coil and a core is carried by the non-stylus end of the pivot arm and pivotal movement of the stylus arm alters the position of the core within the coil. Such LVDTs are well known in the art. The applicant's PCT Application Publication No. WO95/08096 describes a metrological instrument which uses an LVDT transducer.

The DAPCS 1b is programmed by means of processor implementable instructions and data stored in the memory (RAM or EPROM 23 or 24) of the master control system 20 and/or the memory of the computer 10 so as to enable carrying out of measurement operations in accordance with the user's instructions and subsequent retrieval and processing of measurement data again in accordance with a user's instructions.

The instrument 1 as described so far may be implemented by one of the applicant's commercially available "Form Talysurf Series" series of metrological instruments. The instrument shown in FIGS. 1 and 2 is, however, configured by additional or modified processor implementable instructions and/or data to form a new machine which operates in a manner different from the existing Form Talysurf Series series of instruments.

Configuration of the instrument 1 by way of processor instructions and/or data may be carried out by at least one of preprogramming of the EPROM 24, downloading of processor implementable instructions and/or data via the remote link RL or from a removable disk (RD) 14 inserted into the removable disk drive 13 of the computer 10.

Figure 3:
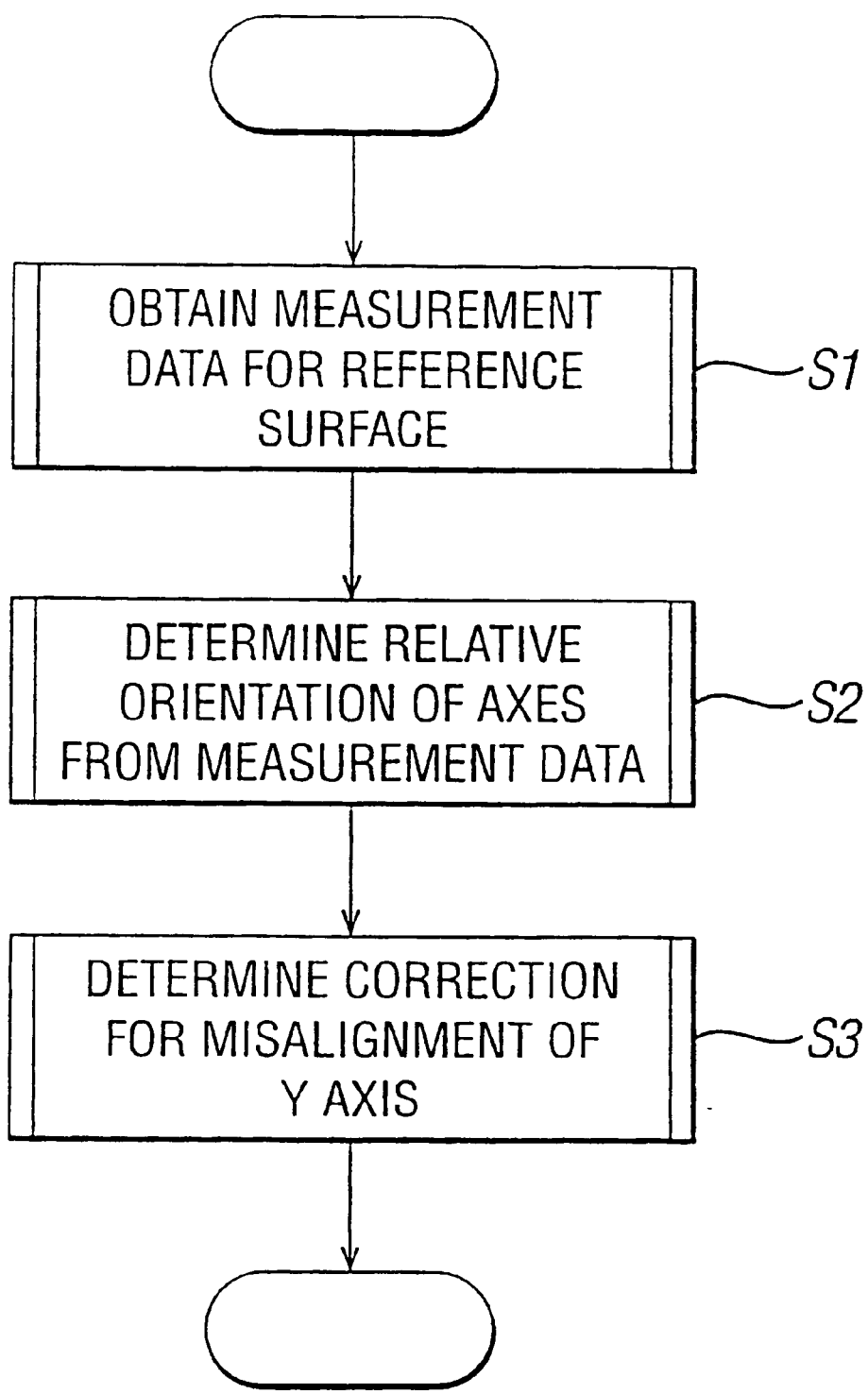
FIG. 3 shows a top level flowchart for illustrating operation of the metrological instrument shown in FIG. 1 to enable determination of the relative orientations of axes along which relative movement between a measurement probe and a surface to be measured can be effected.

FIG. 3 shows a top level flowchart for illustrating operation of the instrument 1 shown in FIG. 1 when configured as described above to form an instrument embodying the present invention.

The instrument 1 is configured so as to first obtain measurement data for a reference surface RS (FIG. 1) mounted to a workpiece chuck (not shown in FIG. 1) carried by the support platform 4 (step S1 in FIG. 3). In this embodiment, the reference surface is provided by a metal sphere of precisely known radius.

Once the DAPCS 1b has obtained the measurement data for the reference surface, DAPCS 1b determines at step S2 in FIG. 3 the relative orientation of the Y traverse axis of the support platform 4 relative to the X traverse axis defined by the X axis datum bar within the column carriage and the Z axis defined by the column 5. The DAPCS 1b then uses this information at step S3 in FIG. 3 to determine any correction required to correct for misorientation of the Y axis relative to the X and Z axis.

The step of obtaining measurement data for the reference sphere will now be described in greater detail with reference to FIG. 4.

Figure 4:
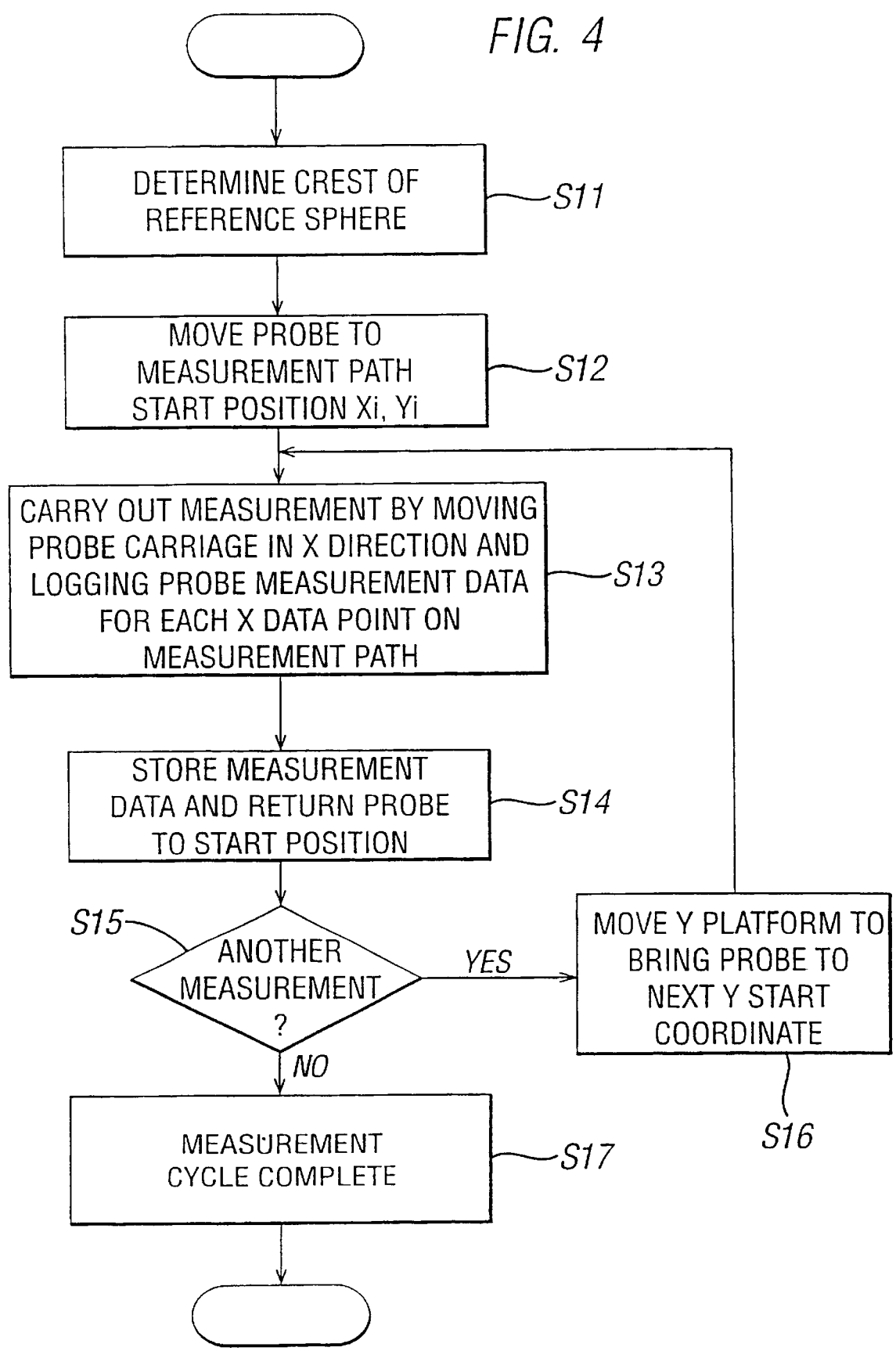
FIG. 4 shows in greater detail the step of obtaining measurement data for a reference surface shown in FIG. 3.

Assuming that the user has mounted the reference sphere to the support platform 4 and carried out any initial rough manual adjustment of the position of the stylus tip using the joystick 25, then the user will generally initially instruct the DAPCS 1b to carry out a known cresting routine (available with existing Form Talysurf Series instruments) to determine the crest, that is the uppermost point, of the reference sphere (step S11 in FIG. 4). This cresting procedure generally involves the DAPCS 1b instructing the measurement probe 8 to make some initial preliminary measurement of the surface from which the DAPCS 1b determines the X,Y coordinates of the highest obtained Z value.

The DAPCS 1b then issues control commands to the X and Y axis drive circuitry 30 and 40 to cause the measurement probe 8 to be positioned so that the stylus 8b is at the desired start location Xi, Yi of the first measurement path (step S12).

The DAPCS 1b then instructs the X axis drive circuitry 30 to cause the measurement probe 8 and thus the stylus 8b to traverse a continuous measurement path in the X direction across the desired surface area. As the stylus 8b traverses the continuous measurement path, the stylus arm 8a will pivot to follow the curvature and surface features of the reference sphere and the measurement transducer 60 will supply to the master control system 20 signals representing the change in the Z position of the stylus 8b as it follows the surface along the continuous measurement path.

In this embodiment, the master control system 20 logs the output of the measurement transducer 60 at predetermined intervals in the X direction with the times at which the microprocessor 22 logs the output of the measurement transducer 60 being determined by the signals received by the master control system 20 from the X position transducer 33. In this example, the X displacement or measurement data is logged at intervals of 0.25 $\mu$m in the X direction (step S13 in FIG. 4).

At the end of the measurement path, the DAPCS 1b causes the probe to return to the start position Xi at step S14 in FIG. 4 and stores the measurement data on the hard disk drive 12. The DAPCS then determines whether another measurement path is to be traversed at step S15. If the answer is yes, then the DAPCS 1b supplies control signals to the Y axis drive circuitry 40 to cause the motor 42 to move the Y platform to bring the measurement probe 8 to the next Y start position at step S16 and then repeats steps 13 to 15. When the answer at step S15 is no, then the measurement cycle is complete (step S17).

In this manner, a desired surface area of the reference sphere is traversed by the measurement probe 8 in a series of parallel measurement paths and the DAPCS 1b stores measurement data representing the changes in the Z position of the stylus 8b at each of the X data points along each of the measurement paths. Generally, the measurement paths will be selected such that each constitutes an arc symmetrically disposed about an X,Y plane extending through the center of the sphere. Generally, also, the measurement paths will include an arc extending through the crest of the sphere with equal numbers of measurement paths on either side of that central arc.

The method of determining the relative orientation of the Y axis (step S2 in FIG. 3) will now be described with reference to FIG. 5.

Figure 6:
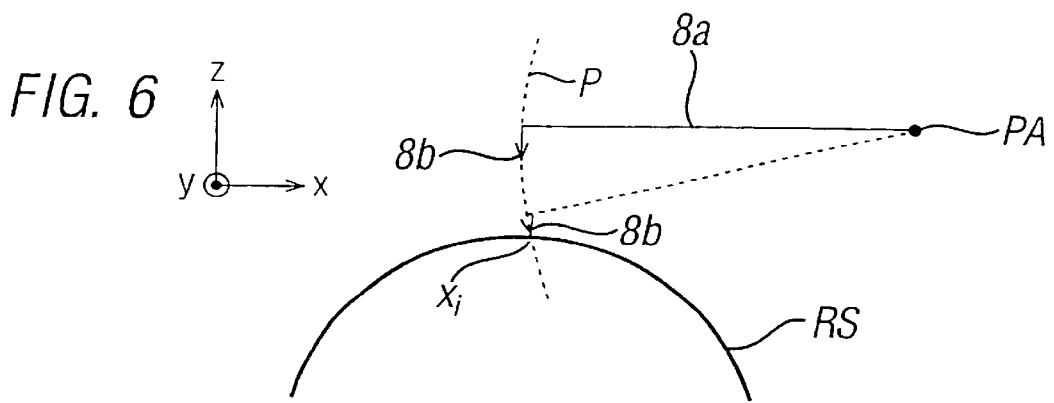
FIG. 6 shows a diagram for illustrating arcuate error in measurement data.

Initially at step S21, the start and end of each measurement path are determined. As shown in FIG. 6, because the stylus arm 8a pivots about a pivot axis PA, the stylus 8b follows an arcuate path P when it is displaced in the Z direction as it follows the surface. This means that the point Xi at which the stylus tip 8b actually contacts the reference surface RS being measured will differ from the X position determined by the X position transducer 33 of the X axis drive circuitry 30.

Figure 7:
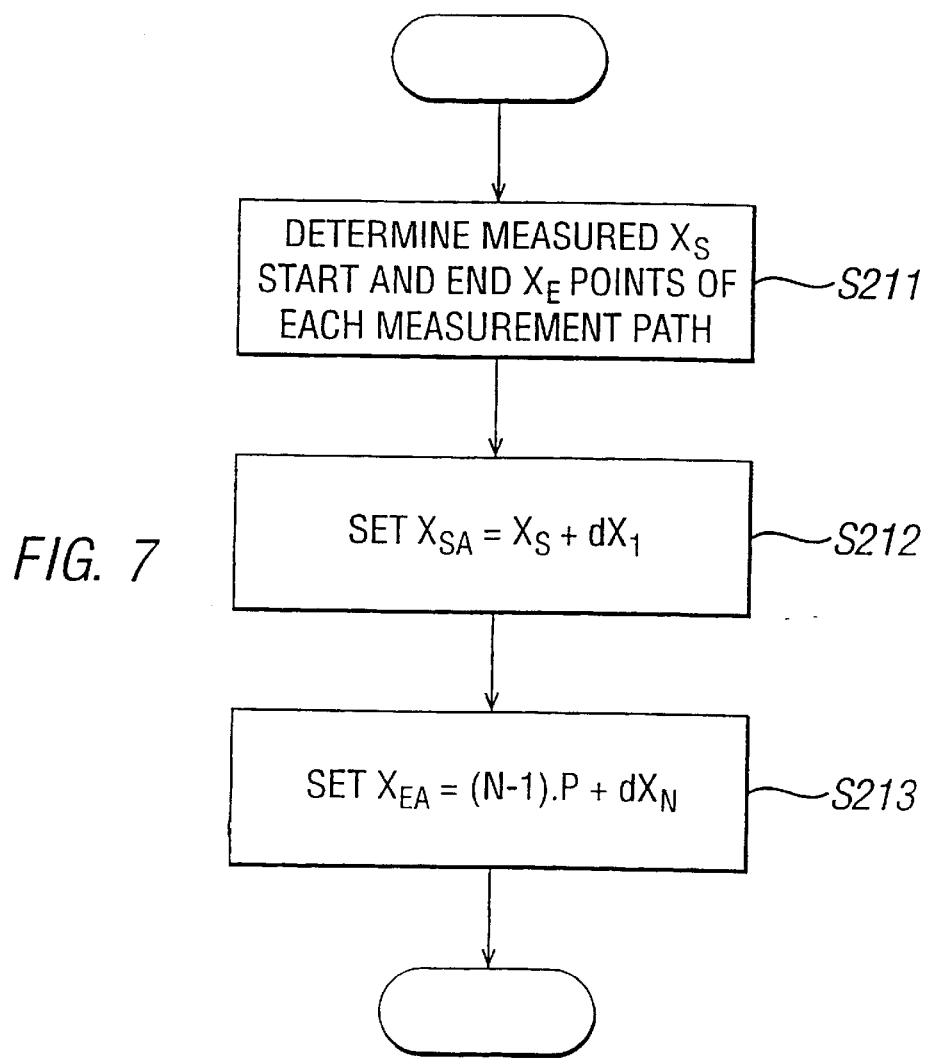
FIG. 7 shows a flowchart illustrating in greater detail the step shown in FIG. 5 of determining start and end points of measurement paths.

FIG. 7 shows a flowchart for illustrating correction for the arcuate error illustrated by FIG. 6 so as to enable the actual start and ends of the measurement paths to be determined. Initially, the X positions measured by the X position transducer 33 of the start $X_S$ and end $X_E$ points of each measurement path are determined at step S211. Then, at step S212, the DAPCS 1b sets the actual X start position $X_{SA}$ equal to the measured X start position $X_s+dX_1$ where $dX_1$ is an arcuate correction term.

Figure 9:
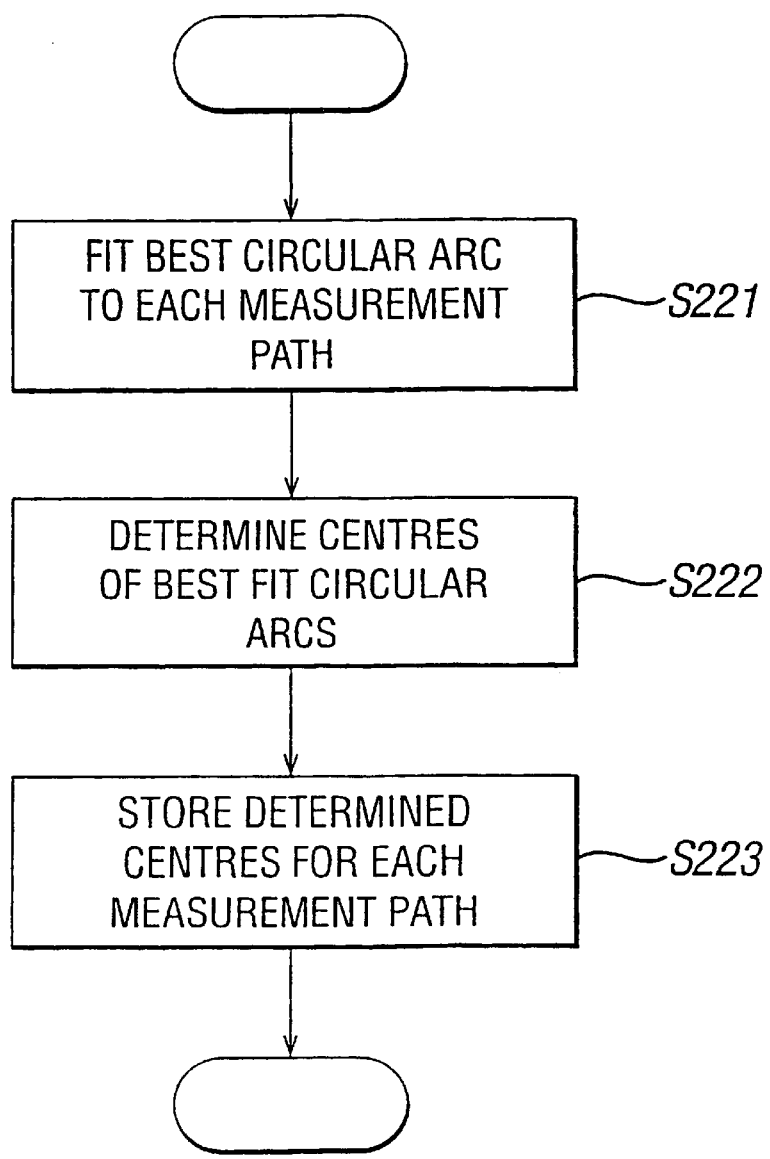
FIG. 9 shows a flowchart illustrating in greater detail the step shown in FIG. 5 of determining the centers of measurement arcs.

The arcuate correction term is determined using the method described in the applicant's U.S. Pat. No. 5,150,314. Thus, the displacement in the Z direction is set to:

$$Z=Az+Bz^2+Cz^3$$

where A, B and C are calibration constants previously determined by causing the stylus 8b to traverse the surface of a calibration sphere as shown in FIG. 9 of U.S. Pat. No. 5,150,314 from a center position to a final position so that the stylus moves through its entire range of movement. This operation to determine the calibration constants A, B and C may be carried out at the factory with the calibration constants prestored in the machine control system 20. However, as thermal variations and the like can cause changes, it is desirable that these calibration constants are determined at least from time to time by the user. In the present case, these calibration constants may be determined using the same reference sphere as that being used for the present operation.

The corrected or actual X position is determined by the DAPCS in accordance with the following equation:

$$X_{actual}=X+DZ_{actual}+EZ^2_{actual}$$

where D and E are calibration constants determined using a calibration sphere (which again may be the same as the current reference sphere). This procedure is described in detail at column 8 line 35 to column 9 line 61 of the applicant's U.S. Pat. No. 5,150,314.

It will be seen from the above that:

$$dX_1=DZ_{actual}+EZ^2_{actual}$$

Once the actual starting $X_{SA}$ position has been determined at step S212 in FIG. 7, then the actual X end position $X_{EA}$ is set equal to:

$$X_{EA}=(N-1).P+dX_N$$

where N is the number of X data points, P is the pitch between the X data points and $dX_N$ is the arcuate correction term for the end point of the measurement path and will be equal to $DZ_{Eactual}+EZ^2_{Eactual}$ where $Z_{Eactual}$ is the actual Z position at the end point of the measurement path (step S213 in FIG. 7). Steps S211 to S213 in FIG. 7 are repeated for each of the measurement paths and the actual start and ends $X_{SA}$ and $X_{EA}$ of each of the measurement paths are stored by the DAPCS 1b at step S21 in FIG. 5.

Figure 8:
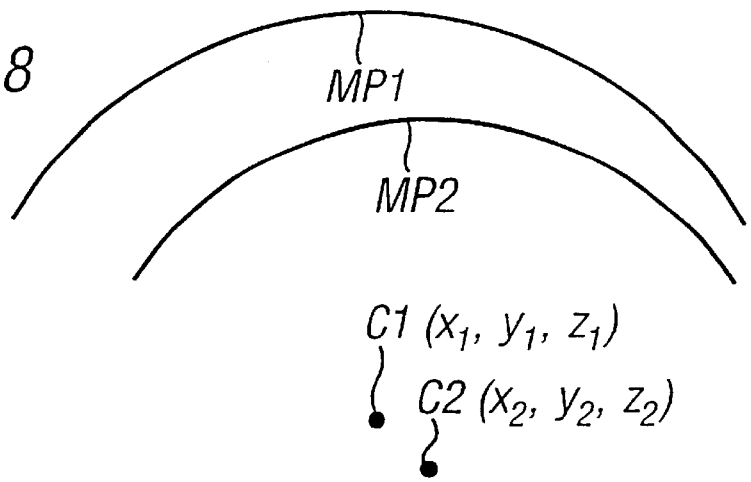
FIG. 8 shows a diagram for illustrating very schematically the effect of misorientation of the relative movement axes.

As will be appreciated, each of the measurement paths over the reference surface is an arc of a circle. As illustrated diagrammatically in FIG. 8 which shows two measurement path arcs MP1 and MP2, if the Y axis is misoriented relative to the X and Z axis, that is if the Y axis is not accurately orthogonal to both the X and Z axes, then the circle centers $C_1$, $C_2$ etc. of the circles corresponding to the measurement arcs will not coincide but will be at different coordinates $X_1Y_1Z_1$ and $X_2Y_2Z_2$ lying on a line. Accordingly, in order to determine any misorientation of the Y axis relative to the X and Z axes, the DAPCS 1b first of all determines for each of the measurement path arc the center of the corresponding circle at step S22 in FIG. 5. FIG. 9 shows a flowchart illustrating this step in detail. Thus, at step S221 in FIG. 9, a standard fitting procedure such as a least mean squares fitting procedure is used to fit the best circle to each of the circular arc measurement paths. Then, at step S222, the relative X, Y, Z coordinates of the center of each of the best fit circles are determined (that is, for example, the points $C_1$, $C_2$ shown in FIG. 8) and, at step S223 in FIG. 9, the relative coordinates of each of the circle centers $C_1$, $C_2$ etc are stored. It will be appreciated that each circle center has a Y coordinate value corresponding to the Y coordinate value of the corresponding measurement path and X and Z coordinate values determined by the best fit circle.

Figure 5:
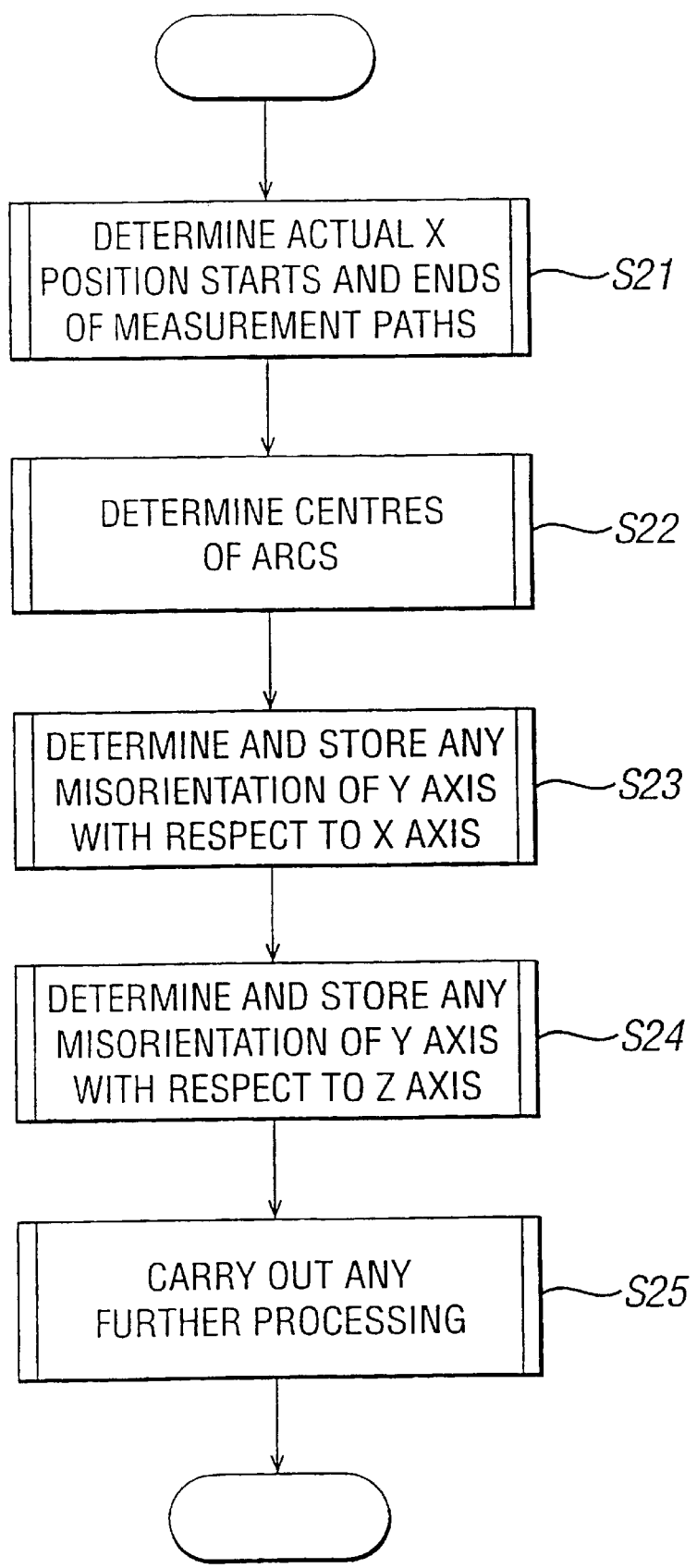
FIG. 5 shows in greater detail the step shown in FIG. 3 of determining the relative orientation of axes of relative movement from the measurement data.

Once the centers of the arcs have been determined at step S22 in FIG. 5, the DAPCS 1b determines and stores any Disorientation of the Y axis with respect to the X axis at step S23 and determines and stores any Disorientation of the Y axis with respect to the Z axis at step S24.

Figure 10:
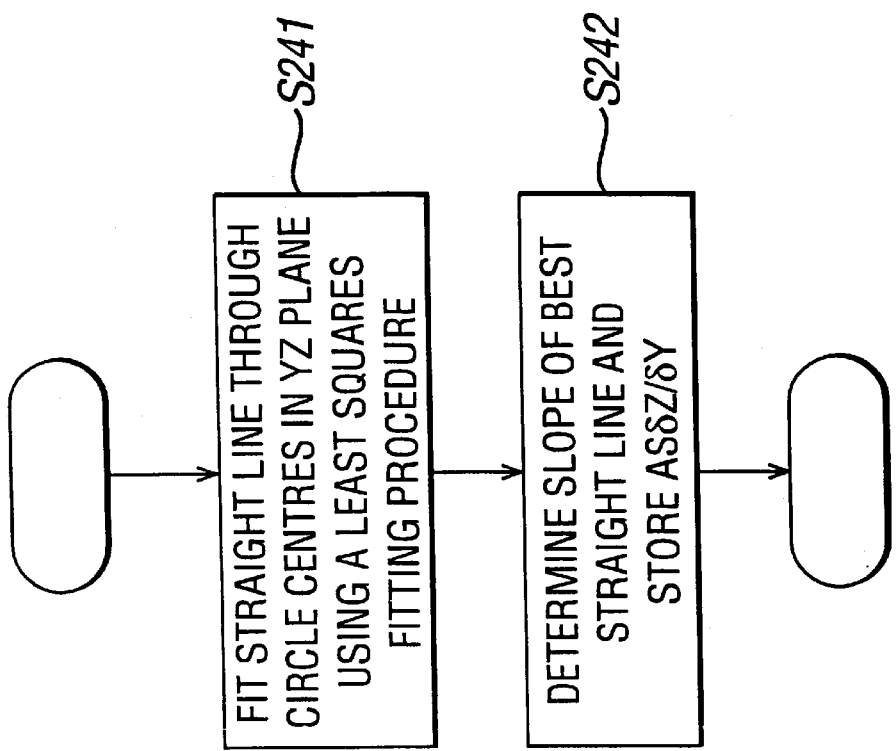
FIGS. 10 and 11 show, respectively, flowcharts for illustrating in greater detail the steps of determining the orientation of the Y axis relative to the X and Z axes shown in FIG. 5.
Figure 11:
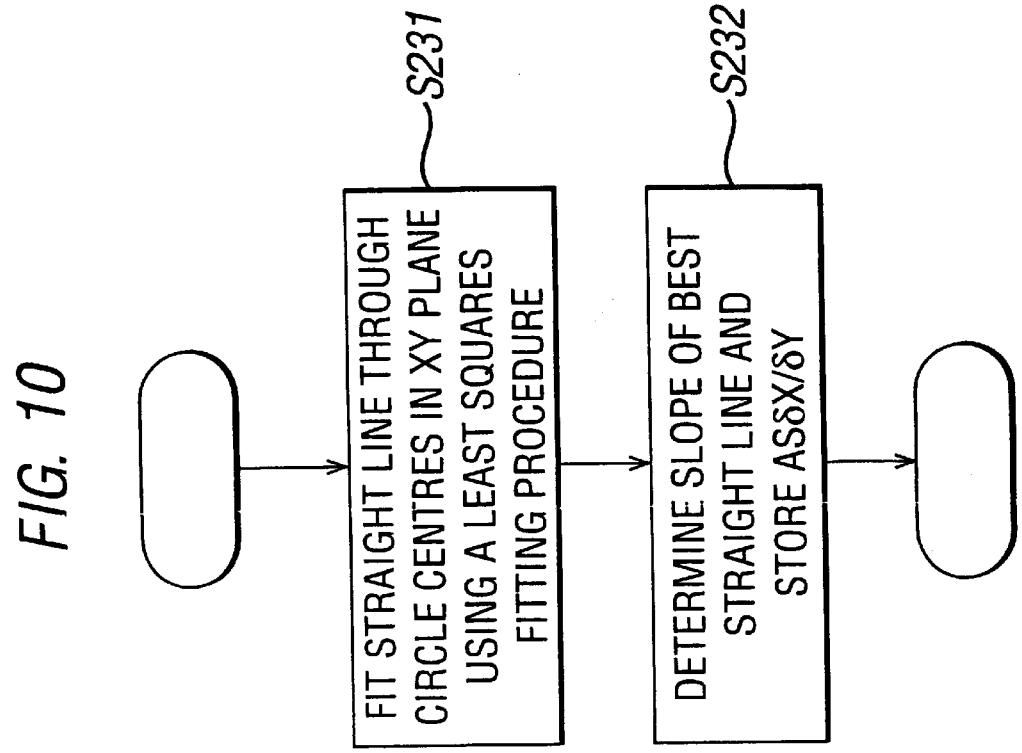

FIGS. 10 and 11 show respectively how the steps S23 and S24 are carried out in this embodiment. As shown in FIG. 10, in order to determine any misorientation of the Y axis with respect to the X axis, the DAPCS 1b takes the relative X,Y coordinates of each of the center points $C_1$, $C_2$ etc and determines the best straight line through those coordinates using a standard fitting procedure such as a least mean squares fitting procedure at step S231. The DAPCS then determines at step S232 the slope or gradient of that straight line in the X,Y plane and stores it as δX/δY.

Similarly, at step S24, the DAPCS takes the Y and Z coordinates of each of the circle centres $C_1$, $C_2$ etc and fits the best straight line in the Y,Z plane through these coordinates using a similar fitting procedure to that used in step S231 (step S241). Then, at step S242, the DAPCS determines the slope in the Y,Z plane of that best straight line and stores it as δZ/δY.

Figure 12:
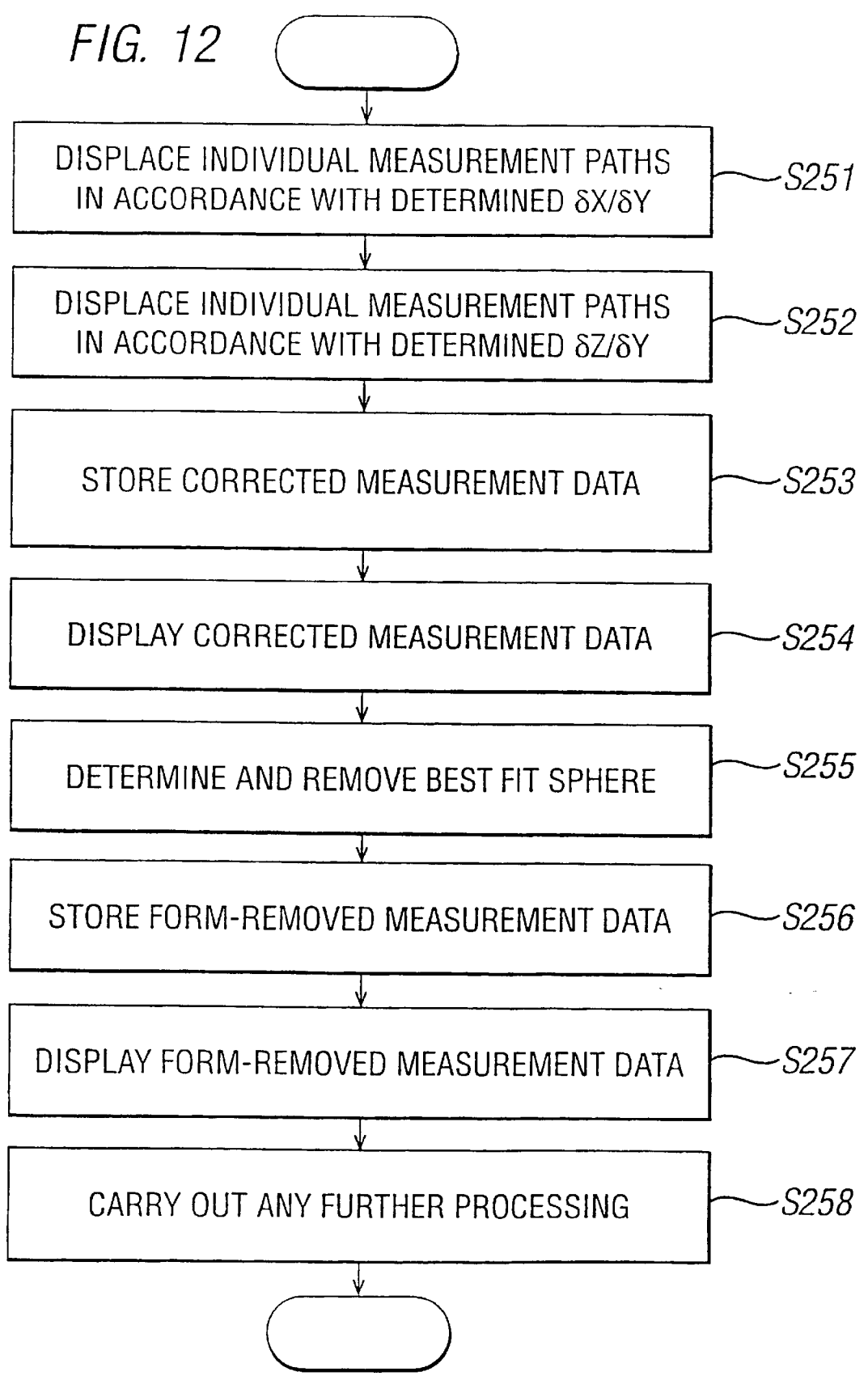
FIG. 12 shows a flowchart illustrating an example of the further processing step shown in FIG. 5.

Further processing may then be carried out at step S25 in FIG. 5. This further processing may consist simply of storing the values δX/δY and δZ/δY as correction values or calibration data that the DAPCS 1b will use to automatically correct subsequent measurement data on unknown surfaces. That would, however, not provide the user with any feedback regarding the calibration procedure that has been carried out. FIG. 12 shows in detail further processing that may be carried out at step S25 in FIG. 5.

At step S251 in FIG. 12, the DAPCS 1b displaces each of the individual measurement paths in accordance with the determined value δX/δY then, at step S252, displaces each of the individual measurement paths in accordance with the determined value δZ/δY. The corrected measurement data is then stored at step S253 and the DAPCS 1b displays the corrected measurement data to the user on the display 17 of the computer 10 at step S254. This data may be displayed to the user as a three-dimensional map or graph.

At this stage, the data displayed to the user necessarily includes the form of the reference body (a sphere in the present case) which makes it difficult for the user to assess the results by eye. Accordingly, at step S255 the DAPCS 1b fits the best spherical surface to the measurement data using known fitting procedures (available for the existing Form Talysurf Series machines) and then removes that best fit spherical surface from the measurement data at step S255. The DAPCS 1b then stores the form-removed measurement data at step S256 and displays the form-removed measurement data to the user at step S257 so that the user can visually inspect the data. Further processing may be carried out at step S258.

To illustrate the procedure described above, examples of actual measurements carried out using the instrument shown in FIG. 1 will now be described.

Figure 18:
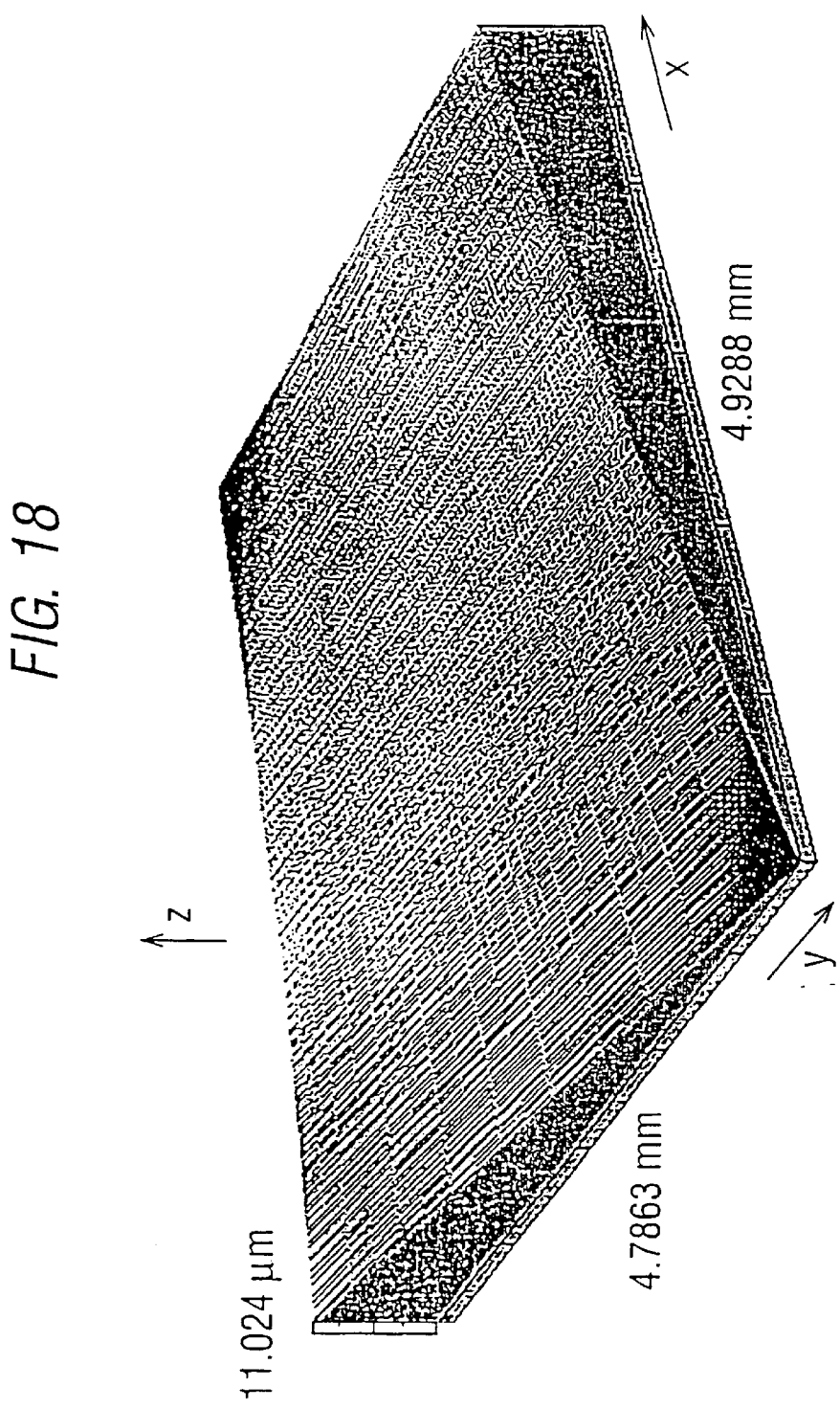
FIG. 18 shows a three-dimensional map or graphical representation of the measurement data obtained using the instrument shown in FIG. 1 for a reference sphere of known radius after removal of the three-dimensional form of the reference sphere but before any further correction.

FIG. 18 shows a three-dimensional surface map or graphical representation of the measurement results obtained at step S1 in FIG. 3 without any correction for Disorientation of the Y axis as set out in steps S2 and S3 of FIG. 3 and after removal of the three-dimensional spherical form of the reference sphere using a known fitting procedure. In this example, the reference sphere had a known calibrated radius of 12.4987 mm (millimeters) and the best fits sphere had a radius of 12.497 mm. Given that the three-dimensional form of the reference sphere has been removed from the data, it would be expected that the resulting graphical representation or surface map would be nominally flat, that is without any form, and would show only surface texture or roughness. However, as can be seen from FIG. 18, the three-dimensional graphical representation shows significant form and in fact has a saddle-shape. This is due to the fact that, as noted above, because of Disorientation of the Y axis relative to the X and Z axes, the centers $C_1$, $C_2$ etc of the circular arc measurement paths do not coincide but be on a line. It will be appreciated from FIG. 18 that determination of specific surface features or characteristics is rendered difficult because of the significant residual form.

Figure 19:
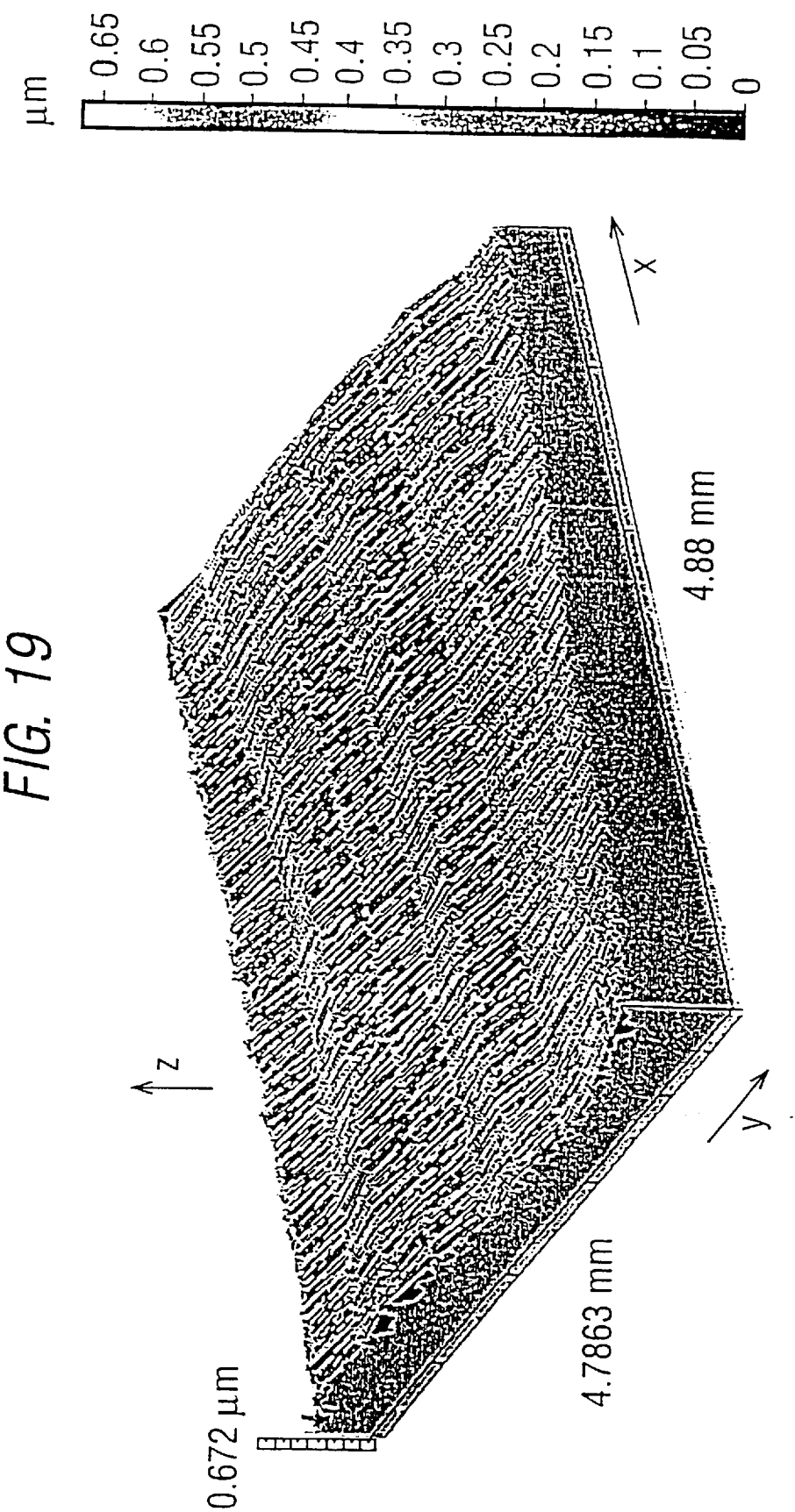
FIG. 19 shows a three-dimensional graphical representation or map of the measurement data shown in FIG. 18 after both removal of the three-dimensional spherical form of the reference sphere and correction for the orientation of the relative movement axes.

In contrast to FIG. 18, FIG. 19 shows the results of implementing a method embodying the present invention wherein the measurement data has been corrected for misorientation of the Y axis determined in the manner described above with reference to FIGS. 3 to 12. Again, the three-dimensional form of the reference sphere has been removed with, in this case, the best fit sphere having a radius of 12.499 mm. It can be seen from a comparison of FIGS. 18 and 19 that the three-dimensional surface map shown in FIG. 19 does not have any significant form. In this regard, it is important to note the difference in Z axis scale between FIG. 18 and FIG. 19, the Z scale having been considerably enlarged in FIG. 19 with respect to that of FIG. 18. The deviation in the Z direction in FIG. 18 (that is the distance in the Z direction between the lowest and highest Z points) is just over 11 μm while in FIG. 19 the deviation in the Z direction is under 0.65 μm.

Figure 20A:
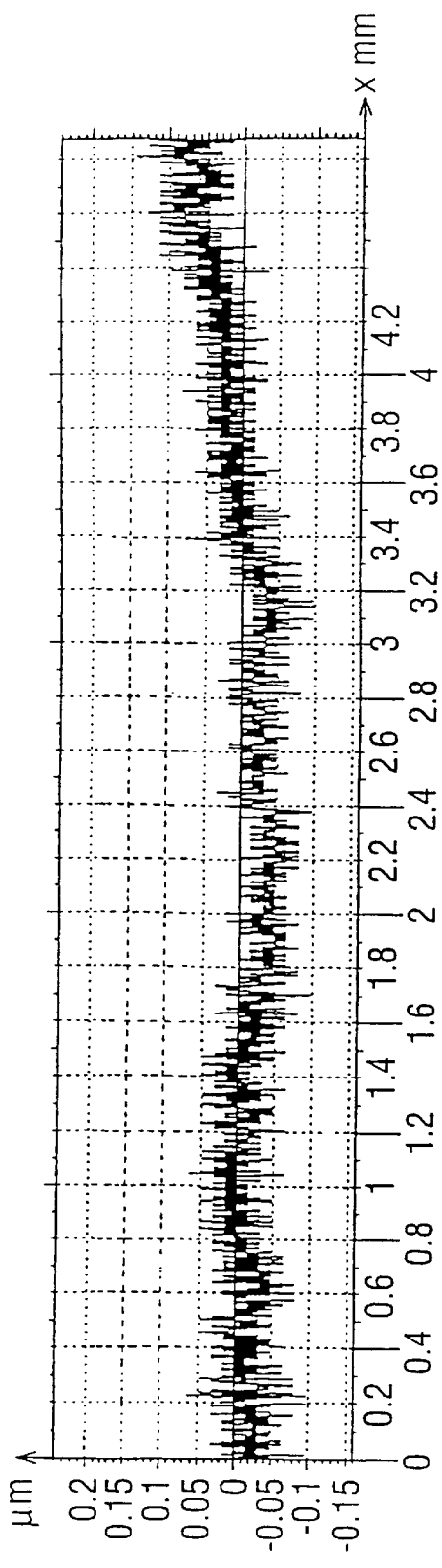
FIGS. 20a and 20b show X and Y direction profiles of the data shown in FIG. 19.
Figure 20B:
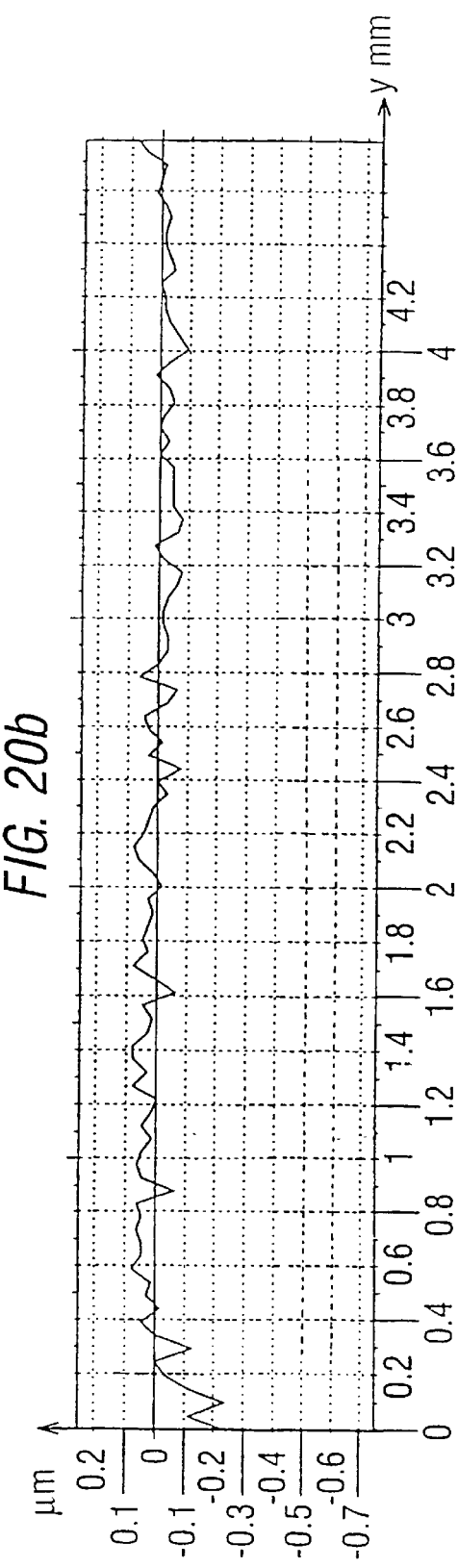

Comparison of FIGS. 18 and 19 shows that correcting for misorientation of the Y relative movement axis relative to the X and Z relative movement axes as described above enables surface texture or characteristics that were not visible in the three-dimensional representation shown in FIG. 18 to be clearly displayed to the user. Furthermore, as shown in FIGS. 20a and 20b, respectively, X and Y profiles taken through the three-dimensional surface shown in FIG. 19 clearly enable surface texture features to be visually identified.

Figure 21:
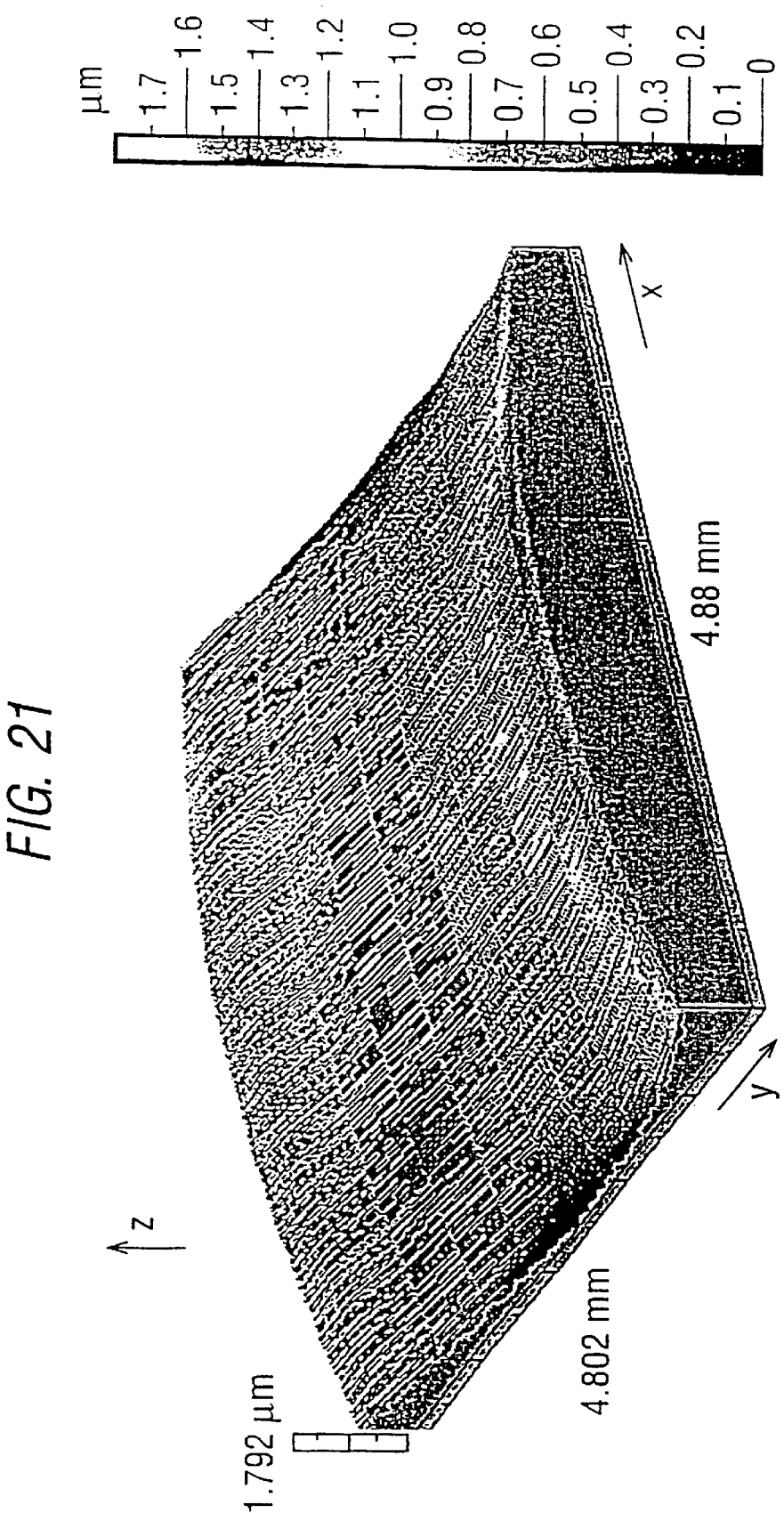
FIG. 21 shows a graphical representation similar to FIG. 19.

In the example shown in FIG. 19, the best fit sphere removed from the measurement data had a radius of 12.499 mm compared to the actual calibrated radius of 12.4987 mm of the reference sphere. FIG. 21 shows a graphical representation similar to FIG. 19 of measurement data obtained using the same reference sphere and also carrying out steps S2 and S3 in FIG. 3. It can, however, be seen from FIG. 21 that this measurement data still includes significant form error. It will also be noticed from FIG. 21 that the best fit sphere removed from the data had a radius of 12.539 mm compared to the actual calibrated radius of 12.4987 mm. Thus, the radius of the best lit sphere was in error by +0.0403 mm and the surface shows a Z deviation of greater than 1 μm. The present inventor has, however, determined that the additional error present in FIG. 21 results from an inaccuracy in the Y data point spacing or pitch which is controlled by the Y axis drive circuitry 40 under the control of the master control system 20.

Figure 13:
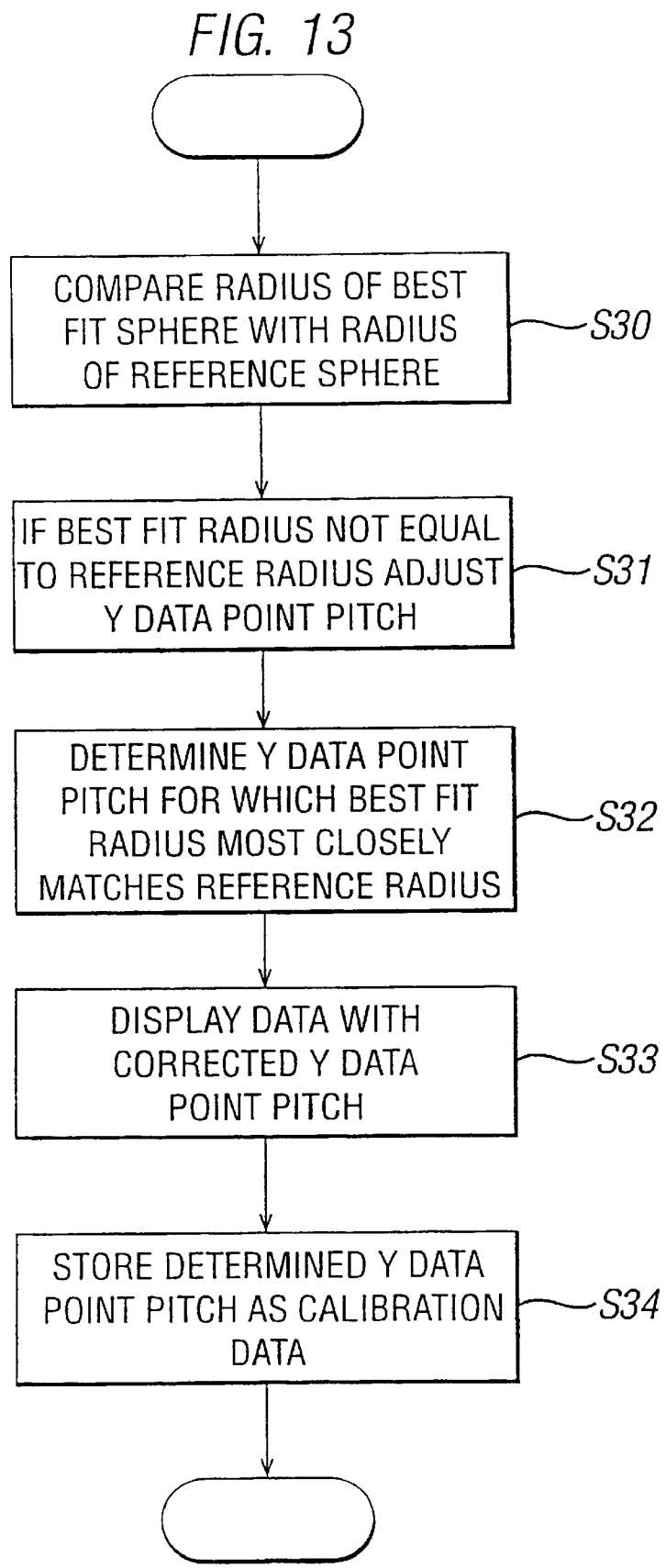
FIG. 13 shows a flowchart to illustrate an example of the additional processing that can be carried out at the additional processing step shown in FIG. 12.

In order to avoid these errors, further processing may be carried out at step S258 in FIG. 12. FIG. 13 shows the details of this further processing. Thus, at step S30, the DAPCS 1b compares the radius of the best fit sphere removed from the measurement data with the calibrated radius of the reference sphere. If the best fit radius does not agree with the reference calibrated radius, then the DAPCS adjusts at step S31 the Y data logging pitch or spacing until the radius of the best fit sphere most closely matches the calibrated radius of the reference sphere. This matching process may be carried out at step S31 using any known error minimisation technique such as a Newton-Raphson method or the like. Once this has been carried out at step S32, the data is redisplayed at step S33 with the Y data pitch adjusted to that required to give the best fit sphere having a radius most closely matching the actual calibrated radius of the reference sphere. The determined y data point pitch is stored as calibration data at step S34. Adjusting the Y spacing in this manner provides a three-dimensional map or graphical representation similar to that shown in FIG. 19 where there is minimal form in the represented surface.

This method therefore allows both misorientation of the Y axis relative to the X and Z axes and correction for inaccuracy in the Y measurement step determined by the Y axis drive circuitry 42 to be compensated for.

Figure 22:
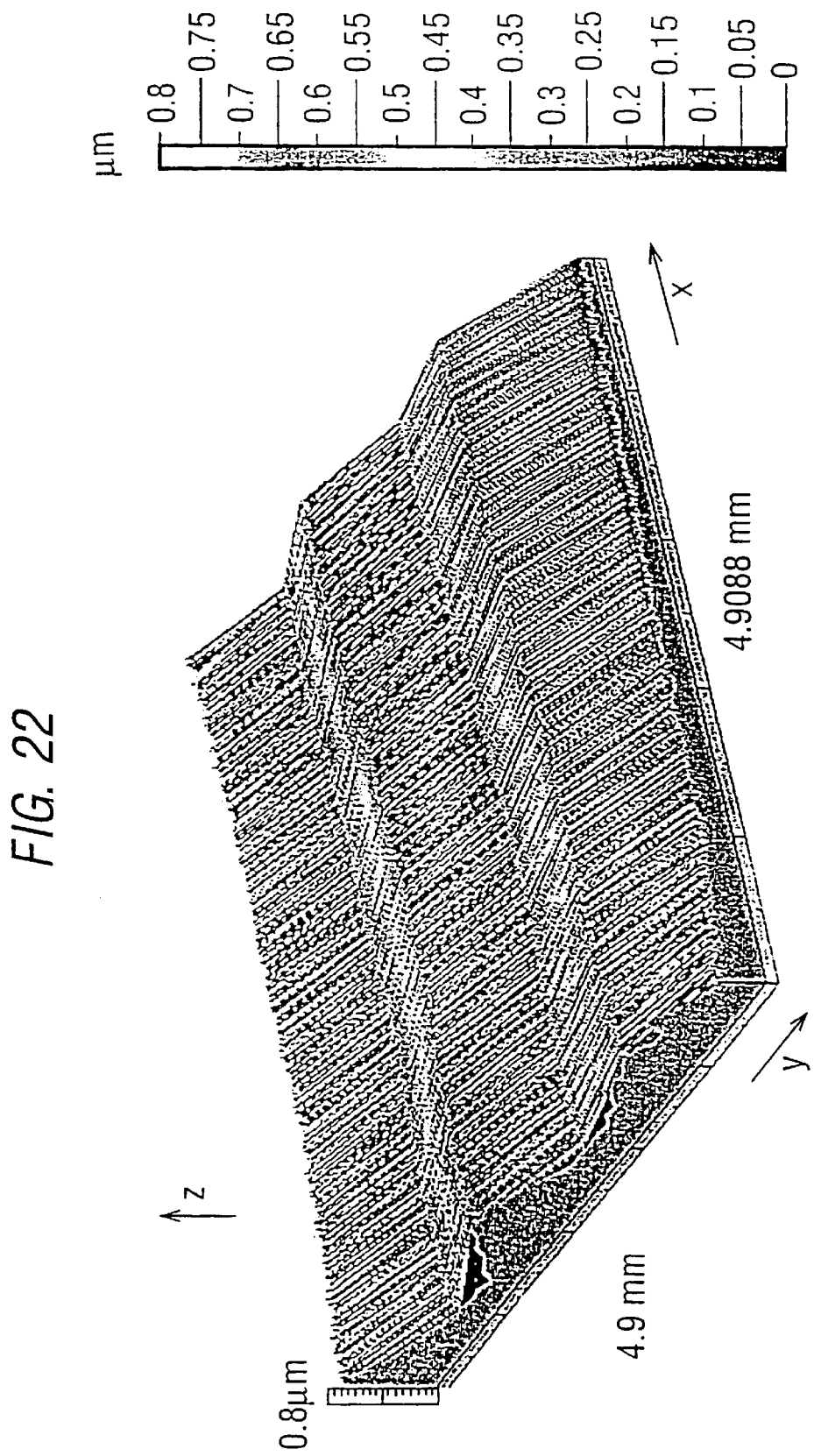
FIG. 22 shows a graphical representation corresponding to that shown in FIG. 19 but for a different reference sphere using a different stage for effecting relative movement between measurement paths of the measurement probe.
Figure 23A:
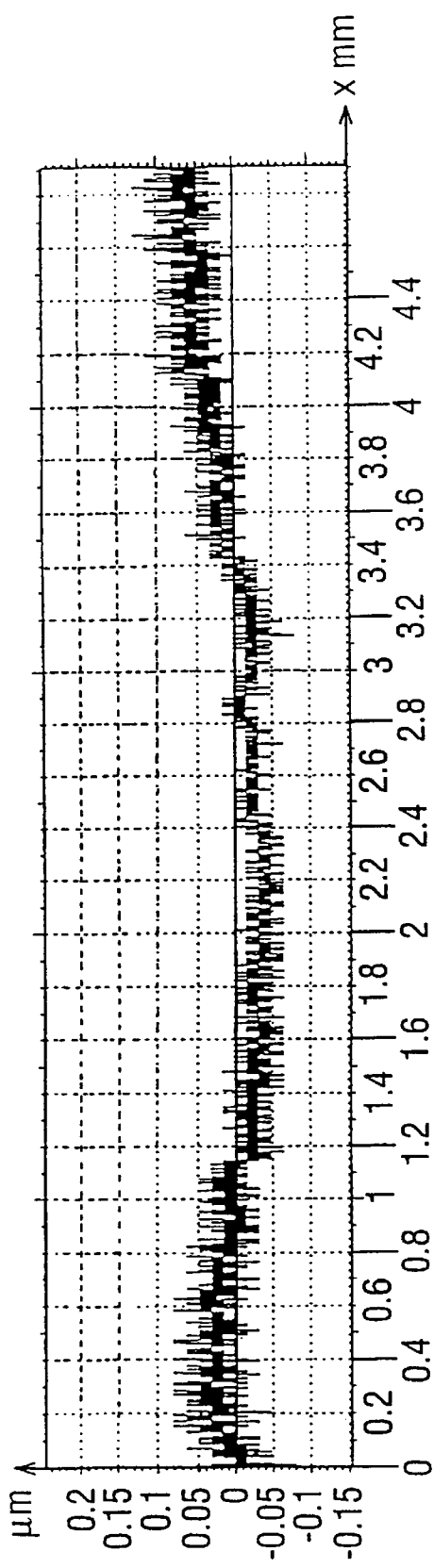
FIGS. 23a and 23b show, respectively, X and Y profiles for the data shown in FIG. 22.
Figure 23B:
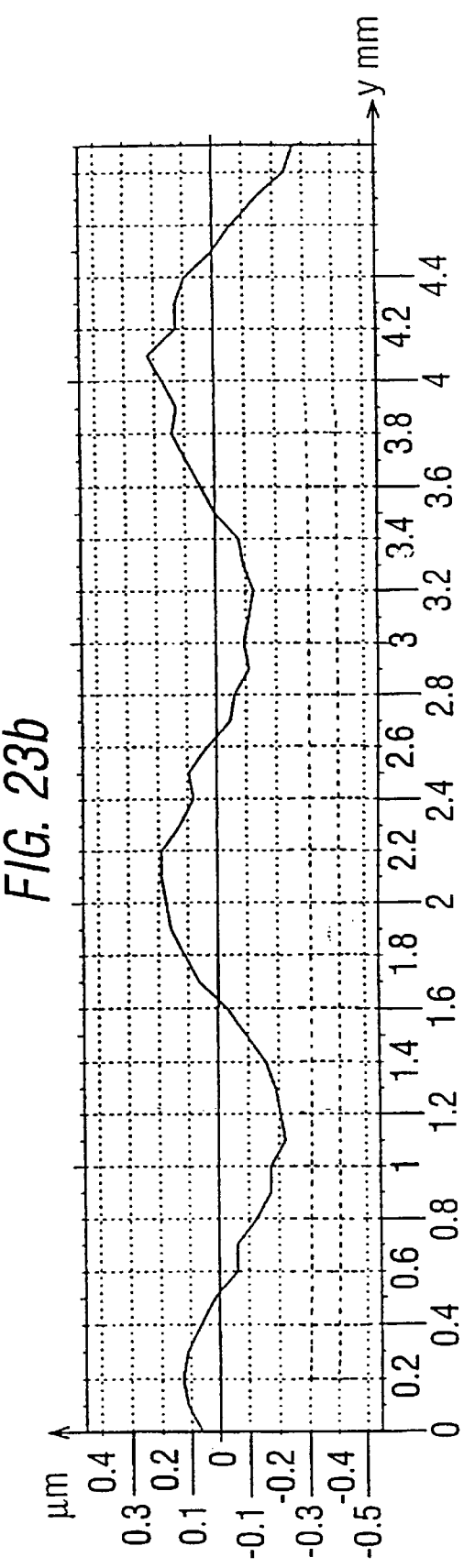

FIG. 22 shows a three-dimensional map or graphical representation similar to FIG. 19 carried out on another instrument with a different Y axis stage 3,4. FIGS. 23a and 23b show corresponding X and Y profiles through the surface. It can be seen from these Figures that the surface representation includes significant periodic form in the Y direction. Making this information available to the user of the instrument enables the user to see that there are additional errors in the instrument that may be due to motion errors in the Y stage 3,4 or possibly due to temperature cycling. The user may then carry out further investigations such as, for example, maintaining the instrument in a more precisely controlled temperature environment to determine whether these additional errors can be removed or whether adjustment of the Y stage 3,4 is required to remove these errors. Where the errors shown in FIGS. 22, 23a and 23b are repeatable from measurement to measurement and are determined to be due to cyclical temperature variations such as the variation between, for example, 19.5 and 20.5° C. in a control temperature environment, then it may be possible to calibrate the instrument to remove these additional errors.

Figure 14:
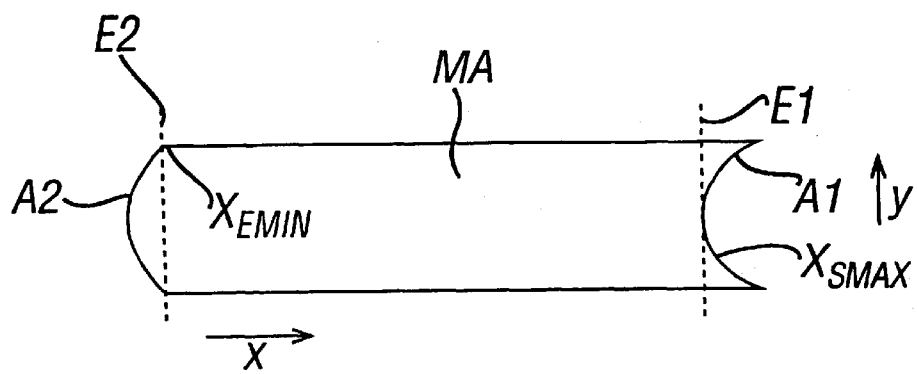
FIG. 14 shows diagrammatically the surface area of a three-dimensional reference surface mapped by the measurement probe during use of the instrument shown in FIG. 1.

In the examples shown in FIGS. 18, 19, 21 and 22, the surface area which is the subject of the measurement is displayed as a rectangular area and is approximately 4.8 mm×4.9 mm. It will, however, be appreciated that the surface area traversed by the measurement path during a measurement operation will not be a rectangular area because the start and end points of the measurement paths will not coincide. FIG. 14 shows schematically an example of a measurement area MA where the arcs A2 and A1 illustrate lines through the start and end points, respectively of the measurement path. Although it is possible to store the measurement data in this form, this requires that X and Y coordinates as well as the Z coordinates for each measurement point are stored. Converting the measurement area to a rectangular area enables the Z or height data to be stored on the basis of implicit X and Y values and therefore reduces the amount of memory space required to store the data. It can be seen that this is advantageous once it is realised that the number of data points for a measurement of the order of 5 mm square can be up to 256×4096.

Figure 15:
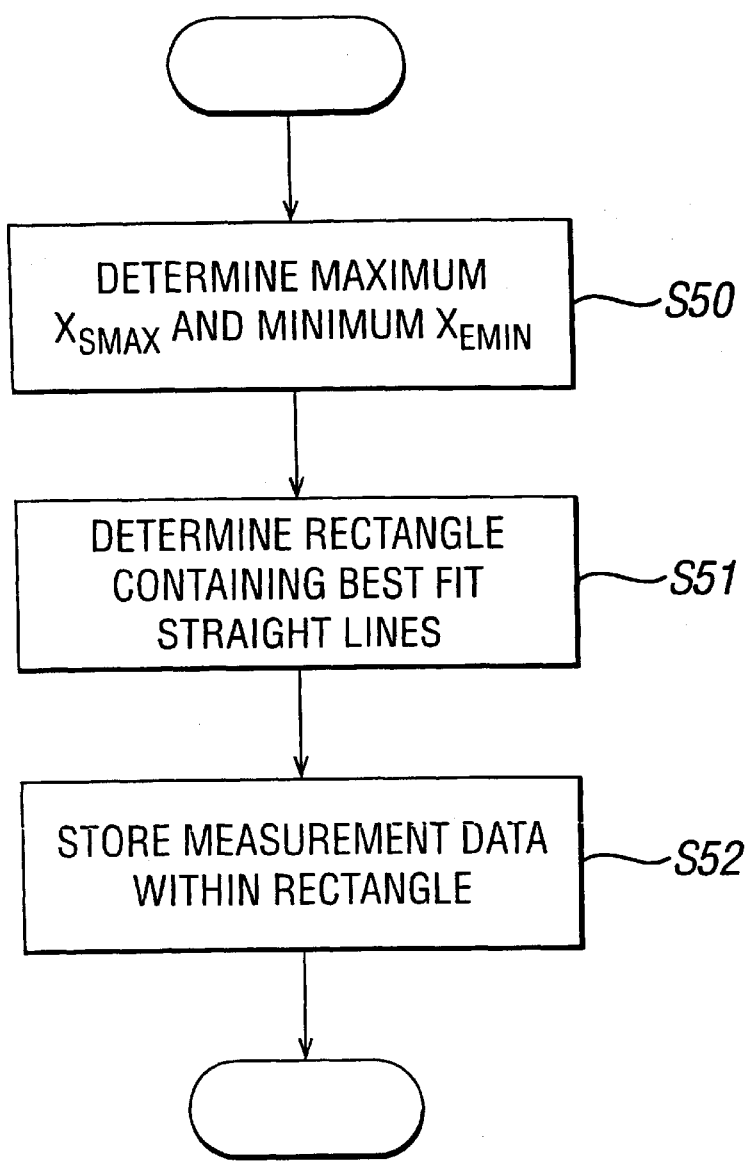
FIG. 15 shows a flowchart for illustrating optional further processing that can be carried out at the further processing step shown in FIG. 5.

FIG. 15 illustrates a further routine that may be carried out by the DAPCS 1b to process the measurement data at step S25 in FIG. 5 to define a rectangular measurement area bounded by the dashed lines shown in FIG. 14. Thus, at step S50, the DAPCS 1b determines which of the start points has the maximum X value $X_{SMAX}$ and which of the end points has the minimum X value $X_{EMIN}$. The DAPCS 1b then uses this data to define a rectangle so that the ends E1 and E2 of the rectangle are defined by the dashed lines orthogonal to the measurement paths and passing through the points $X_{SMAX}$ and $X_{EMIN}$, respectively. The DAPCS 1b also ensures at step S51 that this rectangle contains the best fit straight lines determined at steps S231 and S241 in FIGS. 10 and 11, respectively, to ensure that the X coordinates value of the start and end points of each measurement path lie either on the lines E1 and E2, respectively, or outside the rectangle so that there is data for each X data point within the defined rectangular area. The DAPCS 1b then stores the measurement data within the rectangle at step S52. As noted above, because the measurement data is now within a defined rectangle, the height or Z data can be stored using implicit X and Y values. It will, of course, be appreciated that the step shown in FIG. 15 will be carried out before the further processing step shown in FIGS. 12 and 13.

Figure 16:
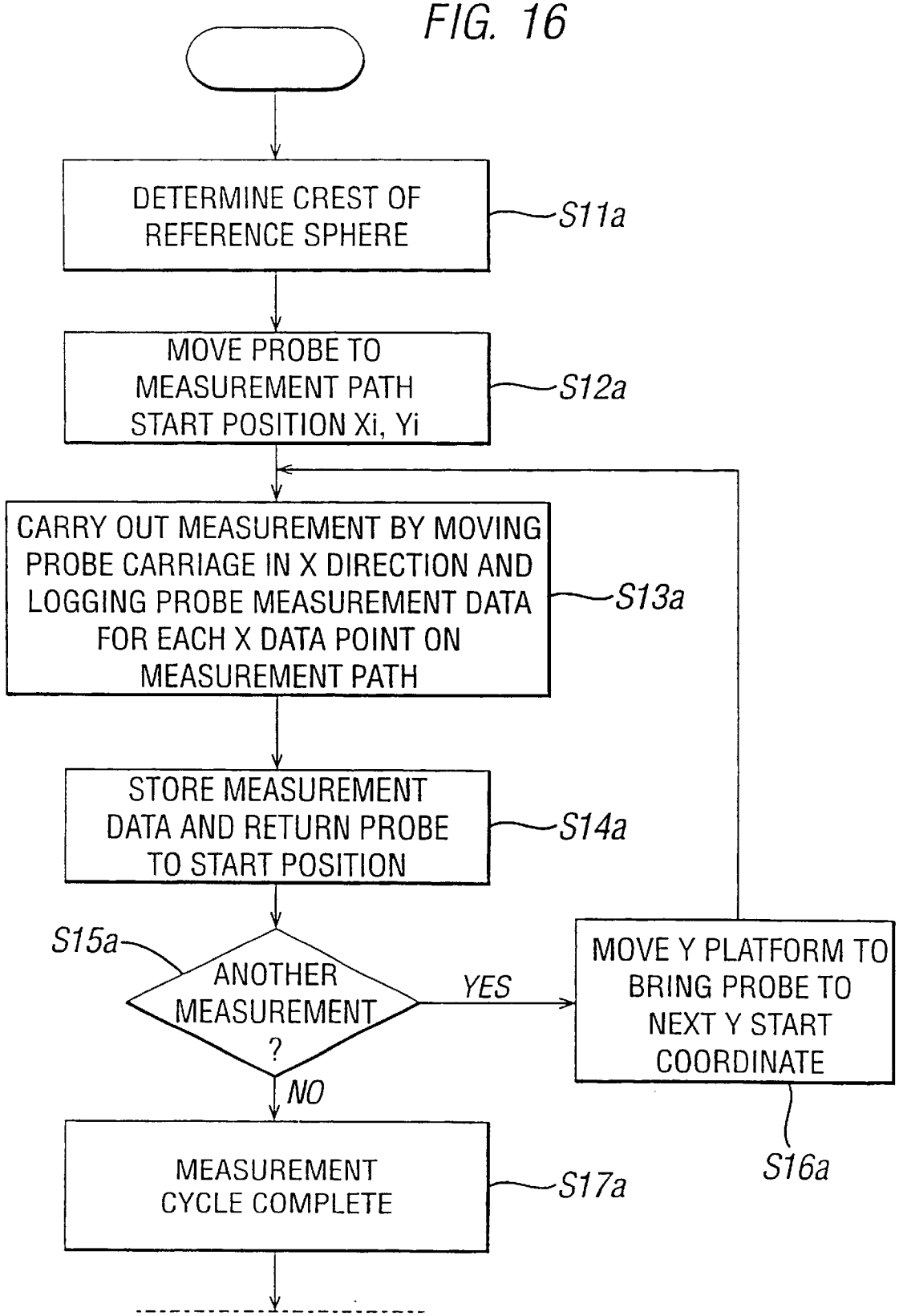
FIG. 16 shows a flowchart for illustrating use of the instrument shown in FIG. 1 to map a surface area of a workpiece.
Figure 17:
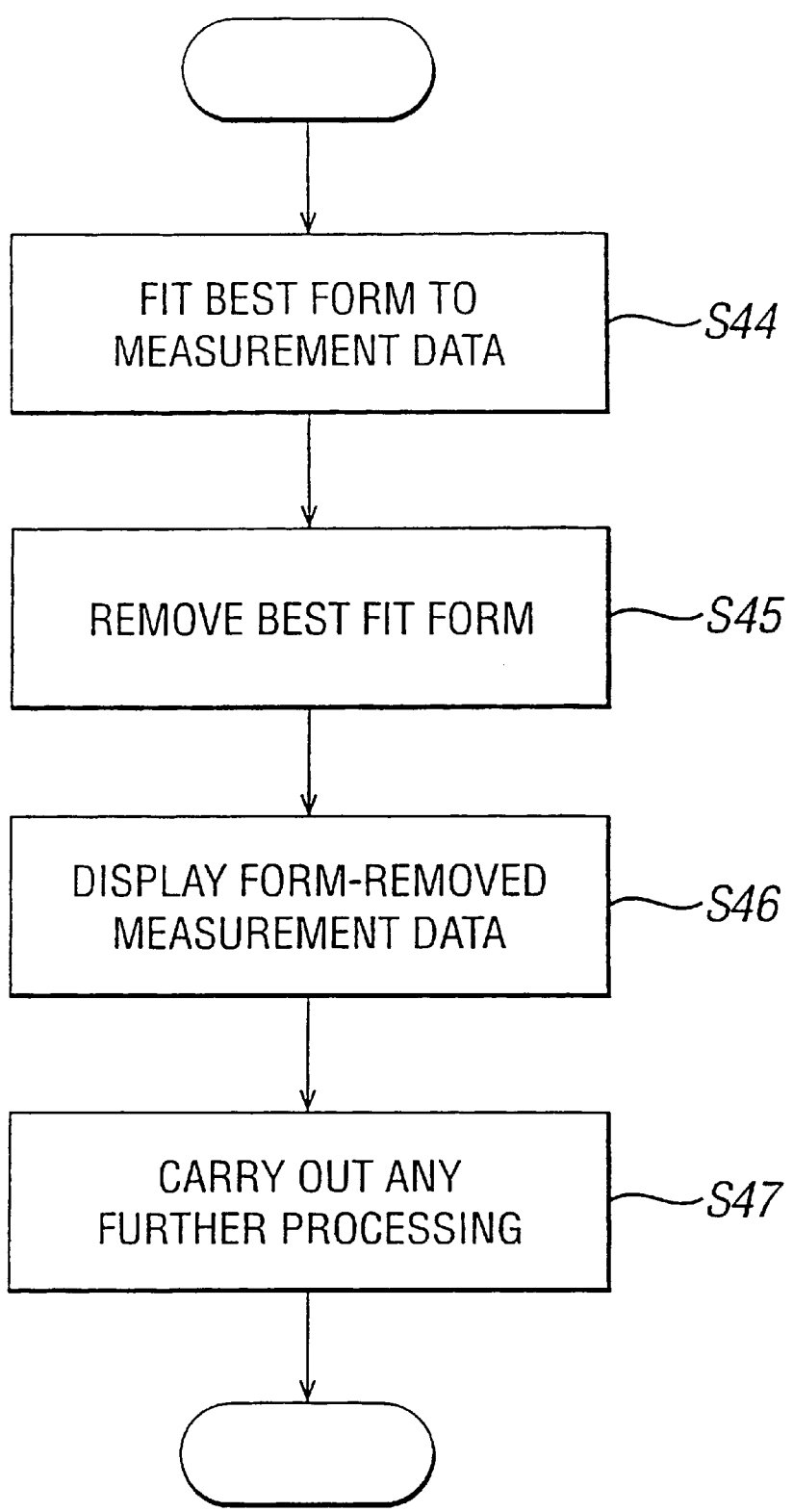
FIG. 17 shows a flowchart for illustrating further processing that may be carried out at the further processing step shown in FIG. 16.

The method described above enables calibration data to be obtained so as to enable the DAPCS 1b to correct for misorientations in the orientation of the Y axis relative to the X and Z axes and inaccuracies in the precise determination of the Y data logging pitch. This calibration data may then be used by the DAPCS 1b to compensate for these errors during subsequent measurements on workpieces having unknown three-dimensional shapes or form. FIGS. 16 and 17 illustrate the steps carried out to effect a measurement on an unknown surface. Steps S11a to S17a correspond to steps S11 to S17 shown in FIG. 4 except that, in this case, the steps are carried out on the unknown surface rather than on the calibrated reference surface. Also, the measurement data may be processed as described with reference to FIG. 15 to restrict the measurement data to a rectangular area.

Once all the measurement data has been stored at step S17a, the DAPCS 1b accesses the calibration data obtained in the manner described above at step S40 and then corrects each measurement path in accordance with the calibration data at step S41. Step S41 may involve correcting each measurement path for the misorientation of the Y axis relative to the X and Z axes using the stored values $\delta Z/\delta Y$ and $\delta X/\delta Y$ mentioned above. Additionally, where the calibration process described above has determined an inaccuracy in the Y data point spacing, then the correction carried out at step S41 will also correct data to adjust the Y data point spacing in accordance with the stored calibration data. The corrected data may then be displayed to the user at step S42 and subsequent processing may be carried out at step S43 if required by the user. For example, as shown in FIG. 17, this further processing may comprise the removal of the three-dimensional form from the measurement data by, at step S44, fitting the best three-dimensional form to the measurement data using a known polynomial fitting process, then removing the form at step S45 and displaying the form-removed measurement data at step S46.

Further processing may be carried out on the measurement data at step S47. For example, the user may obtain actual measurements relating to the three-dimensional form of the surface from the result of the best fit carried out at step S44. Alternatively or additionally, the user may process the form-removed measurement data in known manner to determine characteristics regarding the surface roughness or texture of the surface.

In the above described embodiments, the reference object used is a sphere. The reason for this is that it is not necessary for the sphere to be precisely aligned on the platform 4. The above described method may be carried out using reference bodies of other shapes. For example, a reference cylinder may be used. However, this would mean that the user would need to ensure that the longitudinal axis of the cylinder was accurately and precisely aligned with the Y axis of the instrument, or perform additional computation to correct for the relative alignment of the axes.

In the above described embodiments, the measurement probe uses a pivotable stylus arm. The present invention may, however, be applied to a metrological instrument having an axially movable rather than a pivotable measurement probe so that as the measurement probe is moved along the continuous measurement path, instead of the measurement probe pivoting as it follows surface variations along the continuous measurement path, the measurement probe as a whole moves in the Z direction. The measurement probe may, for example, consist of an elongate stylus arm arranged with its longitudinal axis parallel to the said axis so that when relative movement is effected between the workpiece and the measurement probe, a stylus tip at the end of the elongate stylus arm follows variations in the surface along the continuous measurement path so that the stylus arm as a whole moves in the Z direction, that is parallel to its longitudinal axis. Where the present invention is applied to metrology instruments using axially movable measurement probes, then the arcuate error discussed above will not arise. However, movement of the measurement probe should, of course, be calibrated throughout its range so as to determine any variations in X or Y with Z using a procedure similar to that described above with reference to FIG. 7.

Also, in the above described embodiments, the measurement probe contacts the surface. However non-contact measurement probes such as atomic force measurement probes could also be used.

In the above described embodiments, processing of the measurement data to determine the misorientation of the Y axis relative to the X and Z axis is carried out separately for each axis. Determination of the misorientation of the Y axis in both the X and Z directions may be carried out simultaneously however.

In the above described examples, the three axes X, Y and Z are orthogonal. This need not, however, be the case. For example, the Y axis may be at a precise angle other than 90° to the X and Z axes.

In the embodiments described above, the column 5 and column carriage 6 provide for movement in the Z direction. The main reason for this is to accommodate objects of varying sizes. However, where the instrument is to be used for measuring objects of very similar dimensions in the Z direction, then the column carriage 6 may be fixed in position on the column 5.

In the above described embodiments, the DAPCS comprises a computer and an additional master control system 20. It will, however, be appreciated that all operations of the instrument may be controlled by a single processor with appropriate interfaces to the drive and transducer circuitry.

In the above described embodiments, correction is made for misorientation or misalignment of the Y axis because the Y axis is least precisely defined in the instrument. It will, of course, be appreciated that where one of the other two axes is the least precisely defined, then the above described method may be modified so that correction is made for misalignment or Disorientation of that axis.

In the above described embodiments, the Y platform is moved in the Y direction and the probe is moved in the X direction. These may be reversed.

In the above described embodiments the metrological instrument is a standalone instrument designed for measuring surface characteristics or features of objects or workpieces. The present invention may however be applied to machine tools (and other machines where motion along different axes is required) to enable the relative orientation of machine tool axes to be determined. For example, the present invention may be applied to a machine tool such as a lathe where, for measurement purposes, the cutting tool is replaced by the measurement probe or a machine tool such as a polishing machine where the polishing tool is replaced by the measurement probe. The measurement probe is then controlled using the machine tool motion controls to follow a plurality of measurement paths over a surface of a reference object, generally a sphere as described above. The measurement probe measurement data is then logged and processed in the manner described above with, in this case, the information regarding the data point pitch and spacing in the measurement direction (the X direction in the above examples) and the pitch between measurement paths (the movement in the Y direction in the above examples) being determined from the machine tool. The term 'metrological instrument' as used herein should therefore be understood to relate not only to specific standalone instruments for measuring surface characteristics of objects but also to machine tools and other machines adapted to make the metrological measurements as described above.

What is claimed is:

1. An instrument, comprising:
   means for receiving a measurement probe;
   first moving means for effecting relative movement in a first direction between a support for receiving a reference object of known form and the measurement probe receiving means so as to cause the measurement probe to traverse a measurement path across a surface of the reference object received by the support to provide measurement data representing variations, in a second direction different from the first direction, of surface features of the reference object surface along the measurement path;
   second moving means for effecting relative movement between the support and the measurement probe receiving means in a third direction different from the first and second directions;
   control means for causing the first moving means to effect said relative movement in said first direction a plurality of times and for causing the second moving means to effect said relative movement in said third direction between movements in said first direction for causing the measurement probe to traverse a plurality of said measurement paths across an area of the surface of the reference object mounted on the support and to provide measurement data representing variations in the surface along each measurement path; and
   processor means comprising determining means for using measurement data provided by the measurement probe and representing variations across the area of the surface of the reference object to determine the relative orientations of the first and third directions.

2. An instrument according to claim 1, wherein the receiving means is arranged to receive a measurement probe or a machine tool component such that the instrument is operable as a metrological instrument when the measurement probe is received by the receiving means and is operable as a machine tool when the machine tool component is received by the receiving means.

3. An instrument according to claim 2, further comprising a machine tool component comprising a cutting or polishing device.

4. An instrument according to claim 1, further comprising means for correcting measurement data provided by the measurement probe in accordance with any error in the determined relative orientations of the first and third directions.

5. An instrument according to claim 4, wherein the determining means is arranged to use the measurement data provided by the measurement probe and representing variations across the surface area of the reference object of known form to determine the relative orientations of the first and third directions and the relative orientations of the second and third directions, and wherein the correcting means is operable to correct measurement data provided by the measurement probe in accordance with any error in the relative orientations of the first and third directions and any error in the relative orientations of the second and third directions.

6. An instrument according to claim 4, further comprising means for correcting measurement data in accordance with the determined value and means for storing calibration data corresponding to corrections made by the correcting means.

7. An instrument according to claim 1, wherein the reference object is such that each measurement path forms an arc and the determining means comprises first determining means for determining a central focus or axis of each arc and second determining means for using the determined central foci or axes to determine the relative orientations of the first and third directions.

8. An instrument according to claim 7, wherein the second determining means comprises means for fitting a line through the centers of the arcs to determine the orientation of the third direction to the first direction.

9. An instrument according to claim 7, wherein the second determining means comprises means for fitting a line through the centers of the arcs in the plane containing the first and third directions to determine the orientation of the third direction to the first direction.

10. An instrument according to claim 1, wherein the determining means is arranged to use the measurement data provided by the measurement probe and representing variations across the surface area of the reference object of known form to determine the relative orientations of the first and third directions and the relative orientations of the second and third directions.

11. An instrument according to claim 10, wherein the reference object is such that each measurement path forms an arc and the determining means comprises first determining means for determining a central focus or axis of each arc and second determining means for using the determined central foci or axes to determine the relative orientations of the first and third directions and of the second and third directions.

12. An instrument according to claim 11, wherein the second determining means comprises means for fitting a line through the centres of the arcs to determine the relative orientations of the first and third directions.

13. An instrument according to claim 11 wherein the second determining means comprises means for fitting a first line through the centers of the arcs in the plane containing the first and third directions to determine the orientation of the third direction to the first direction and for fitting a second line through the centers of the arcs in the plane containing the second and third directions to determine the orientation of the third direction to the second direction.

14. An instrument according to claim 1, further comprising means for pivotally supporting the measurement probe so that the measurement probe pivots about a pivot axis in response to surface variations.

15. An instrument according to claim 14, wherein the reference object is such that each measurement path forms an arc and the determining means comprises first determining means for determining a central focus or axis of each arc and second determining means for using the determined central foci or axes to determine the relative orientations of the first and third directions, and further comprising means for correcting start and end points of each measurement path for arcuate errors in the movement of the measurement probe.

16. An instrument according to claim 1, further comprising means for correcting start and end points of each measurement path for errors in the movement of the measurement probe.

17. An instrument according to claim 1, wherein the processor means further comprises means for fitting a three-dimensional form to the reference object measurement data, means for comparing a characteristic of the fitted three-dimensional form to the corresponding characteristic of the reference object, and means for adjusting a value representing the distance of relative movement in the third direction between measurement paths to determine the value for that distance for which the characteristic of the fitted form most closely corresponds to the characteristic of reference object.

18. An instrument according to claim 17, further comprising means for correcting measurement data in accordance with the determined value.

19. An instrument according to claim 1, further comprising output means for removing surface form data from measurement data provided by the measurement probe.

20. A metrological instrument for determining surface features comprising at least one of surface form and texture, comprising:

first moving means for effecting relative movement in a first direction between a support for receiving a reference object of known form and a measurement probe so as to cause the measurement probe to traverse a measurement path across a surface of the reference object received by the support to provide measurement data representing variations, in a second direction different from the first direction, of surface features of the reference object along the measurement path;

second moving means for effecting relative movement between the support and the measurement probe in a third direction different from the first and second directions;

control means for causing the first moving means to effect said relative movement in said first direction a plurality of times and for causing the second moving means to effect said relative movement in said third direction between movements in said first direction to cause the measurement probe to traverse a plurality of said measurement paths across an area of the surface of the reference object mounted on the support and to provide measurement data representing variations in the surface along each measurement path; and processor means for processing the measurement data provided by the measurement probe to produce data representing features of at least one of surface form and texture of the surface, the processor means further comprising determining means for using measurement data provided by the measurement probe and representing variations across a surface area of a reference object of known form to determine the relative orientations of the first and third directions.

21. An instrument according to claim 20, further comprising means for outputting measurement data to a user.

22. An instrument according to claim 21, wherein the output means is arranged to provide a topographical or perspective representation of the measured surface area.

23. An instrument according to claim 21, further comprising means for correcting measurement data in accordance with the determined value and means for removing surface form data from measurement data provided by the measurement probe and wherein the processor means is arranged to output measurement data to the output means after correction and surface form removal.

24. An instrument according to claim 21, wherein the output means comprises a display.

25. An instrument according to claim 1 or 20, wherein the first, second and third directions are mutually orthogonal.

26. A metrological instrument for determining surface features comprising at least one of surface form and texture, comprising:

first moving means for effecting relative movement in a first direction between a support for receiving an object and a measurement probe so as to cause the measurement probe to traverse a measurement path across a surface of an object received by the support to provide measurement data representing variations, in a second direction different from the first direction, of surface features along the measurement path;

second moving means for effecting relative movement between the support and the measurement probe in a third direction different from the first and second directions;

control means for causing the first moving means to effect said relative movement in said first direction a plurality of times and for causing the second moving means to effect said relative movement in said third direction after each movement in said first direction to cause the measurement probe to traverse a plurality of measurement paths across an area of the surface of an object mounted on the support and to provide measurement data representing variations in the surface along each measurement path; and processor means for processing the measurement data provided by the measurement probe to produce data representing features of at least one of surface form and texture of the surface;

wherein the processor means further comprises determining means for using measurement data provided by the measurement probe and representing variations across a surface area of a reference object of known form to determine any difference between a measured value of a characteristic representing the form of the reference object and the actual value of that characteristic, means for adjusting a value representing the distance moved in the third direction between measurement paths to determine the distance value for which the measured value of the characteristic most closely matches the actual value and means for using the determined distance to correct or adjust measurement data.

27. Control apparatus for controlling an instrument, comprising:

means for causing first moving means to effect relative movement a plurality of times in a first direction between a support for receiving a reference object of known form and a measurement probe so as to cause the measurement probe to traverse a measurement path across a surface of the reference object received by the support to provide measurement data representing variations, in a second direction different from the first direction, of surface features along the measurement path;

means for causing second moving means to effect relative movement between the support and the measurement probe in a third direction different from the first and second directions between movements in said first direction to cause the measurement probe to traverse a plurality of said measurement paths across an area of the surface of the reference object and to provide measurement data representing variations in the surface along each measurement path; and processor means comprising determining means for using measurement data provided by the measurement probe and representing variations across the surface area of the reference object to determine the relative orientations of the first and third directions.

28. Control apparatus for a metrological instrument for determining surface features comprising at least one of surface form and texture, comprising:

means for causing first moving means to effect relative movement a plurality of times in a first direction between a support for receiving an object and a measurement probe so as to cause the measurement probe to traverse a measurement path across a surface of an object received by the support to provide measurement data representing variations, in a second direction different from the first direction, of surface features along the measurement path;

means for causing second moving means to effect relative movement between the support and the measurement probe in a third direction different from the first and second directions between movements in said first direction to cause the measurement probe to traverse a plurality of said measurement paths across an area of the surface of an object mounted on the support and to provide measurement data representing variations in the surface along each measurement path; and processor means for processing the measurement data provided by the measurement probe to produce data representing features of at least one of surface form and texture of the surface of the object, wherein the processor means further comprises determining means for using measurement data provided by the measurement probe and representing variations across a surface area of a surface of a reference object of known form to determine the relative orientations of the first and third directions.

29. Apparatus according to claim 27 or 28, further comprising means for correcting measurement data provided by the measurement probe in accordance with any error in the relative orientations of the first and third directions.

30. Apparatus according to claim 27 or 28, wherein the reference object is such that each measurement path forms an arc and the determining means comprises first determining means for determining a central focus or axis of each arc and second determining means for using the determined central foci or axes to determine the relative orientations of the first and third directions.

31. Apparatus according to claim 30, wherein the second determining means comprises means for fitting a line through the centers of the arcs to determine the orientation of the third direction to the first direction.

32. Apparatus according to claim 30, wherein the second determining means comprises means for fitting a line through the centers of the arcs in the plane containing the first and third directions to determine the orientation of the third direction to the first direction.

33. Apparatus according to claim 27 or 28, wherein the determining means is arranged to use the measurement data provided by the measurement probe and representing variations across the surface area of the reference object of known form to determine the relative orientations of the first and third directions and the relative orientations of the second and third directions.

34. Apparatus according to claim 33, further comprising means for correcting measurement data provided by the measurement probe in accordance with any error in the relative orientations of the first and third directions, wherein the correcting means is operable to correct measurement data provided by the measurement probe in accordance with any error in the relative orientations of the first and third directions and any error in the relative orientations of the second and third directions.

35. Apparatus according to claim 33, wherein the reference object is such that each measurement path forms an arc and the determining means comprises first determining means for determining a central focus or axis of each arc and second determining means for using the determined central foci or axes to determine the relative orientations of the first and third directions and the second and third directions.

36. Apparatus according to claim 35, wherein the second determining means comprises means for fitting a line through the centers of the arcs to determine the orientation of the first and third directions and the second and third directions.

37. Apparatus according to claim 35, wherein the second determining means comprises means for fitting a first line through the centers of the arcs in the plane containing the first and third directions to determine the orientation of the third direction to the first direction and for fitting a second line through the centers of the arcs in the plane containing the second and third directions to determine the orientation of the third direction to the second direction.

38. Apparatus according to claim 27 or 28, further comprising means for correcting start and end points of each measurement path for errors in the movement of the measurement probe.

39. Apparatus according to claim 27 or 28, further comprising means for correcting start and end points of each measurement path for arcuate errors in the movement of the measurement probe.

40. Apparatus according to claim 27 or 28, wherein the processor means further comprises means for fitting a three-dimensional form to the reference object measurement data, means for comparing a characteristic of the fitted three-dimensional form to the corresponding characteristic of the reference object and means for adjusting a value representing the distance of relative movement in the third direction between measurement paths to determine the value for that distance for which the characteristic of the fitted form most closely corresponds to the characteristic of reference object and means for correcting measurement data in accordance with the determined value.

41. An instrument according to claim 27 or 28, further comprising means for removing surface form data from measurement data provided by the measurement probe.

42. Apparatus according to claim 27 or 28, further comprising output means for providing a topographical or perspective representation of the measured surface area.

43. A method of determining the relative orientation of axes of an instrument having a first mover for effecting relative movement along a first axis in a first direction between a support for receiving an object, a receiver for receiving a measurement probe so as to cause the measurement probe to traverse a measurement path across a surface of an object received by the support to provide measurement data representing variations, in a second direction different from the first direction, of surface features along the measurement path, and a second mover for effecting relative movement between the support and the receiver along another axis in a third direction different from the first and second directions, the method comprising the steps of:

causing the first mover to effect said relative movement in said first direction a plurality of times and causing the second mover to effect said relative movement in said third direction between movements in said first direction to cause the measurement probe to traverse a plurality of said measurement paths across an area of the surface of a reference object of known form mounted on the support and to provide measurement data representing variations in the reference object surface along each measurement path; and determining the relative orientations of the first and third directions using measurement data provided by the measurement probe and representing variations across said surface area of said reference object.

44. A method of obtaining calibration data using a metrological instrument having a first mover for effecting relative movement in a first direction between a support for receiving an object and a measurement probe so as to cause the measurement probe to traverse a measurement path across a surface of an object received by the support to provide measurement data representing variations, in a second direction different from the first direction, of surface features along the measurement path, and a second mover for effecting relative movement between the support and the measurement probe in a third direction different from the first and second directions, the method comprising the steps of:

causing the first mover to effect said relative movement in said first direction a plurality of times and causing the second mover to effect said relative movement in said third direction between movements in said first direction to cause the measurement probe to traverse a plurality of said measurement paths across an area of the surface of a reference object mounted on the support and to provide measurement data representing variations in the surface of known form along each measurement path; and determining the relative orientations of the first and third directions using measurement data provided by the measurement probe and representing variations across said surface area of said reference object.

45. A method according to claim 43 or 44, further comprising correcting measurement data provided by the measurement probe in accordance with any error in the determined relative orientations of the first and third directions.

46. A method according to claim 43 or 44, wherein the reference object is such that each measurement path forms an arc and the determining step comprises determining a central focus or axis of each arc and using the determined central foci or axes to determine the relative orientations of the first and third directions.

47. A method according to claim 46, which comprises determining the orientation of the third direction to the first direction by fitting a line through the centers of the arcs.

48. A method according to claim 46, which comprises determining the orientation of the third direction to the first direction by fitting a line through the centers of the arcs in the plane containing the first and third directions.

49. A method according to claim 43 or 44, wherein the determining step comprises using the measurement data provided by the measurement probe and representing variations across the surface area of the reference object of known form to determine the relative orientations of the first and third directions and the relative orientations of the second and third directions.

50. A method according to claim 49, further comprising correcting measurement data provided by the measurement probe in accordance with any error in the determined relative orientations of the first and third directions and correcting measurement data provided by the measurement probe in accordance with any error in the relative orientations of the first and third directions and any error in the relative orientations of the second and third directions.

51. A method according to claim 49, wherein the reference object is such that each measurement path forms an arc and the determining step comprises determining a central focus or axis of each arc and using the determined central foci or axes to determine the relative orientations of the first and third directions and the second and third directions.

52. A method according to claim 51, which comprises fitting a line through the centres of the arcs to determine the relative orientations of the first and third directions and the second and third directions.

53. A method according to claim 51, which comprises fitting a first line through the centers of the arcs in the plane containing the first and third directions to determine the orientation of the third direction to the first direction and fitting a second line through the centers of the arcs in the plane containing the second and third directions to determine the orientation of the third direction to the second direction.

54. A method according to claim 43 or 44, further comprising correcting start and end points of each measurement path for errors in the movement of the measurement probe.

55. A method according to claim 43 or 44, further comprising fitting a three-dimensional form to the reference object measurement data, comparing a characteristic of the fitted three-dimensional form to the corresponding characteristic of the reference object, adjusting a value representing the distance of relative movement in the third direction between measurement paths to determine the value for that distance for which the characteristic of the fitted form most closely corresponds to the characteristic of reference object and correcting measurement data in accordance with the determined value.

56. A method according to claim 43 or 44, further comprising removing surface form data from measurement data provided by the measurement probe.

57. A method according to claim 43 or 44, further comprising outputting measurement data to a user as a topographical or perspective representation of the measured surface area.

58. A method of calibrating a metrological instrument for determining surface features comprising at least one of surface form and texture and having:

first moving means for effecting relative movement in a first direction between a support for receiving an object and a measurement probe so as to cause the measurement probe to traverse a measurement path across a surface of an object received by the support to provide measurement data representing variations, in a second direction different from the first direction, of surface features along the measurement path; and second moving means for effecting relative movement between the support and the measurement probe in a third direction different from the first and second directions, the method comprising the steps of:

causing the first moving means to effect said relative movement in said first direction a plurality of times and causing the second moving means to effect said relative movement in said third direction after each movement in said first direction to cause the measurement probe to traverse a plurality of measurement paths across an area of the surface of a reference object of known form mounted on the support and to provide measurement data representing variations in the surface along each measurement path;

determining using measurement data provided by the measurement probe and representing variations across said surface area of said reference object of known form any difference between a measured value of a characteristic representing the form of the reference object and the actual value of that characteristic; and adjusting a value representing the distance moved in the third direction between measurement paths to determine the distance value for which the measured value of the characteristic most closely matches the actual value and using the determined distance value to correct or adjust measurement data.

59. A method according to claim 43, 44, or 58, further comprising supplying a signal carrying measurement data correction data.

60. A method according to claim 43, 44, or 58, further comprising storing measurement data correction data as calibration data on a storage medium.

61. A method of obtaining data representing surface features comprising at least one of surface form and texture using a metrological instrument having a first mover for effecting relative movement in a first direction between a support for receiving an object and a measurement probe so as to cause the measurement probe to traverse a measurement path across a surface of an object received by the support to provide measurement data representing variations, in a second direction different from the first direction, of surface features along the measurement path, and a second mover for effecting relative movement between the support and the measurement probe in a third direction different from the first and second directions, the method comprising the steps of:

causing the first mover to effect said relative movement in said first direction a plurality of times and causing the second mover to effect said relative movement in said third direction between movements in said first direction to cause the measurement probe to traverse a plurality of said measurement paths across an area of the surface of an object mounted on the support and to provide measurement data representing variations in the surface along each measurement path; and correcting the measurement data using correction data obtained using a method in accordance with claim 43 or 44.

62. A storage medium carrying processor instructions for causing processing means to carry out a method in accordance with claim 61.

63. A signal carrying processor instructions for causing processing means to carry out a method in accordance with claim 61.

64. A storage medium carrying processor instructions for causing processing means to carry out a method in accordance with claim 43, 44, or 58.

65. A signal carrying processor instructions for causing processing means to carry out a method in accordance with claim 43, 44, or 58.

66. A metrological instrument for determining surface features comprising at least one of surface form and texture, comprising:

first moving means for effecting relative movement in a first direction between a support for receiving a reference object of known form and a measurement probe so as to cause the measurement probe to traverse a measurement path across a surface of the reference object received by the support to provide measurement data representing variations, in a second direction different from the first direction, of surface features of the reference object along the measurement path;

second moving means for effecting relative movement between the support and the measurement probe in a third direction different from the first and second directions;

control means for causing the first moving means to effect said relative movement in said first direction a plurality of times and for causing the second moving means to effect said relative movement in said third direction between movements in said first direction to cause the measurement probe to traverse a plurality of said measurement paths across an area of the surface of the reference object mounted on the support and to provide measurement data representing variations in the surface along each measurement path;

processor means for processing the measurement data provided by the measurement probe to produce data representing features of at least one of surface form and texture of the surface, the processor means further comprising determining means for using measurement data provided by the measurement probe and representing variations across a surface area of a reference object of known form to determine the relative orientation of the first and third directions, wherein the reference object is such that each measurement path forms an arc and the determining means comprises first determining means for determining a central focus or axis of each arc and second determining means for using the determined central foci or axes to determine the relative orientation of the first and third directions, the instrument further comprising means for pivotally supporting the measurement probe to cause the measurement probe to pivot about a pivot axis in response to surface variations and means for correcting start and end points of each measurement path for errors in the movement of the measurement probe.

67. An instrument, comprising:

means for receiving a measurement probe;

first moving means for effecting relative movement in a first direction between a support for receiving an object and the measurement probe receiving means so as to cause the measurement probe to traverse a measurement path across a surface of a reference object of known form received by the support to provide measurement data representing variations, in a second direction different from the first direction, of surface features of the object along the measurement path; second moving means for effecting relative movement between the support and the measurement probe receiving means in a third direction different from the first and second directions;

control means for causing the first moving means to effect said relative movement in said first direction a plurality of times and for causing the second moving means to effect said relative movement in said third direction between movements in said first direction for causing the measurement probe to traverse a plurality of measurement paths across an area of the surface of an object mounted on the support surface and to provide measurement data representing variations in the surface along each measurement path, determining means for using measurement data provided by the measurement probe and representing variations across a surface area of the reference object to determine the relative orientation of the first and third directions; and means for outputting data to a user to provide a topographical or perspective representation of the measured surface.

68. A control apparatus for a metrological instrument comprising:

a first mover operable to effect relative movement between a measurement probe and a support surface in a first direction so as to cause the measurement probe to traverse and follow changes in a second direction different from the first directions, in a surface of an object mounted to the support surface; and a second mover operable to effect relative movement between the support surface and the measurement probe in a third direction different from the first and second directions, the control apparatus comprising:

a controller operable to cause the measurement probe to be moved relative to the surface to be measured in the third direction after the measurement probe completes a measurement path in the first direction so that the measurement probe traverses a plurality of parallel measurement paths, and a processor operable to process measurement data received from the measurement probe as a result of the traversal of the plurality of parallel measurement paths, the processor being operable to process measurement data received as a result of the measurement probe traversing a surface area of known three-dimensional form to determine the orientation of the third direction relative to the first direction and to provide data representing that relative orientation.

69. A metrological instrument having a controller in accordance with claim 68.

70. A method of obtaining data representing surface features comprising at least one of surface form and texture using a metrological instrument having first moving means for effecting relative movement in a first direction between a support for receiving an object and a measurement probe so as to cause the measurement probe to traverse a measurement path across a surface of an object received by the support to provide measurement data representing variations, in a second direction different from the first direction, of surface features along the measurement path, and second moving means for effecting relative movement between the support and the measurement probe in a third direction different from the first and second directions, the method comprising the steps of:

causing the first moving means to effect said relative movement in said first direction a plurality of times and causing the second moving means to effect said relative movement in said third direction between movements in said first direction to cause the measurement probe to traverse a plurality of said measurement paths across an area of the surface of an object mounted on the support and to provide measurement data representing variations in the surface along each measurement path; and correcting the measurement data using correction data obtained using a method in accordance with claim 58.

71. A storage medium carrying processor instructions for configuring computing apparatus to provide the processor means set out in claim 1, 20, 26, 27, 28, 66, 67, or 68.

72. A signal carrying processor instructions for configuring computing apparatus to provide the processor means set out in claim 1, 20, 26, 27, 28, 66, 67, or 68.

* * * * *

UNITED STATES PATENT AND TRADEMARK OFFICE
CERTIFICATE OF CORRECTION

PATENT NO. : 6,594,532 B2  Page 1 of 1
DATED : July 15, 2003
INVENTOR(S) : Michael Mills It is certified that error appears in the above-identified patent and that said Letters Patent is hereby corrected as shown below:

<u>Column 23,</u>
Line 43, after "changes", insert a comma -- , --.
Line 44, "directions," should read -- direction, --.

Signed and Sealed this

Fourteenth Day of October, 2003

JAMES E. ROGAN
*Director of the United States Patent and Trademark Office*